United States Patent
Tsou et al.

(10) Patent No.: US 11,008,449 B2
(45) Date of Patent: May 18, 2021

(54) BIMODAL ETHYLENE, ALPHA-OLEFIN, AND DIENE POLYMERS USING DUAL ORGANOMETALLIC CATALYSTS

(71) Applicant: ExxonMobil Chemical Patents Inc., Baytown, TX (US)

(72) Inventors: Andy H. Tsou, Houston, TX (US); John R. Hagadorn, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 110 days.

(21) Appl. No.: 16/152,979

(22) Filed: Oct. 5, 2018

(65) Prior Publication Data

US 2019/0144653 A1 May 16, 2019

Related U.S. Application Data

(60) Provisional application No. 62/585,634, filed on Nov. 14, 2017.

(51) Int. Cl.
| | |
|---|---|
| *C08F 4/653* | (2006.01) |
| *C08F 4/643* | (2006.01) |
| *C08F 4/6592* | (2006.01) |
| *C08L 23/16* | (2006.01) |
| *C08L 23/08* | (2006.01) |
| *C08F 210/18* | (2006.01) |
| *C08L 23/12* | (2006.01) |
| *C08F 210/06* | (2006.01) |
| *C08F 4/659* | (2006.01) |

(52) U.S. Cl.
CPC .......... *C08L 23/16* (2013.01); *C08F 210/06* (2013.01); *C08F 210/18* (2013.01); *C08L 23/12* (2013.01); *C08F 4/65908* (2013.01); *C08F 2800/20* (2013.01); *C08L 2205/025* (2013.01)

(58) Field of Classification Search
CPC .............. C08F 4/65904; C08F 4/64089; C08F 4/65907; C08L 23/0815; C08L 23/16
See application file for complete search history.

(56) References Cited

U.S. PATENT DOCUMENTS

| | | |
|---|---|---|
| 6,528,670 B1 | 3/2003 | Rix |
| 7,943,711 B2 | 5/2011 | Srinivasan |
| 7,973,116 B2 | 7/2011 | Hagadorn et al. ............ 526/172 |
| 9,102,773 B2 | 8/2015 | Hagadorn et al. |
| 2004/0242784 A1 | 12/2004 | Tau et al. ...................... 525/240 |
| 2015/0141590 A1 | 5/2015 | Hagadorn et al. .... C08F 210/16 |
| 2018/0002352 A1 | 1/2018 | Hagadorn et al. |
| 2018/0201700 A1 | 7/2018 | Holtcamp et al. ...... C08F 10/02 |

FOREIGN PATENT DOCUMENTS

| | | |
|---|---|---|
| EP | 3026070 | 6/2016 |
| WO | WO 2007-035492 | 3/2007 |
| WO | 2016/114914 | 7/2016 |
| WO | 2016/171809 | 10/2016 |
| WO | 2016/171810 | 10/2016 |
| WO | 2017/052847 | 7/2017 |
| WO | 2017/127185 | 7/2017 |

OTHER PUBLICATIONS

Brown et al., "Ammonia Activation by a Nickel NCN-Pincer Complex featuring a Non-Innocent N-Keterocyclic Carbene: Ammine and Amido Complexes in Equilibrium," Angewandte, Communications, 2015, vol. 54, No. 21, pp. 6274-6277.

*Primary Examiner* — Caixia Lu

(57) ABSTRACT

The present disclosure provides catalyst systems having a bridged metallocene compound and a transition metal pyridyldiamide compound for use in alkene polymerization to produce multimodal polyolefins, such as multimodal ethylene, propylene, diene monomer copolymers. In some embodiments, the present disclosure provides for polyolefins and processes for producing a polyolefin composition including contacting at least one olefin with a catalyst system of the present disclosure.

25 Claims, 2 Drawing Sheets

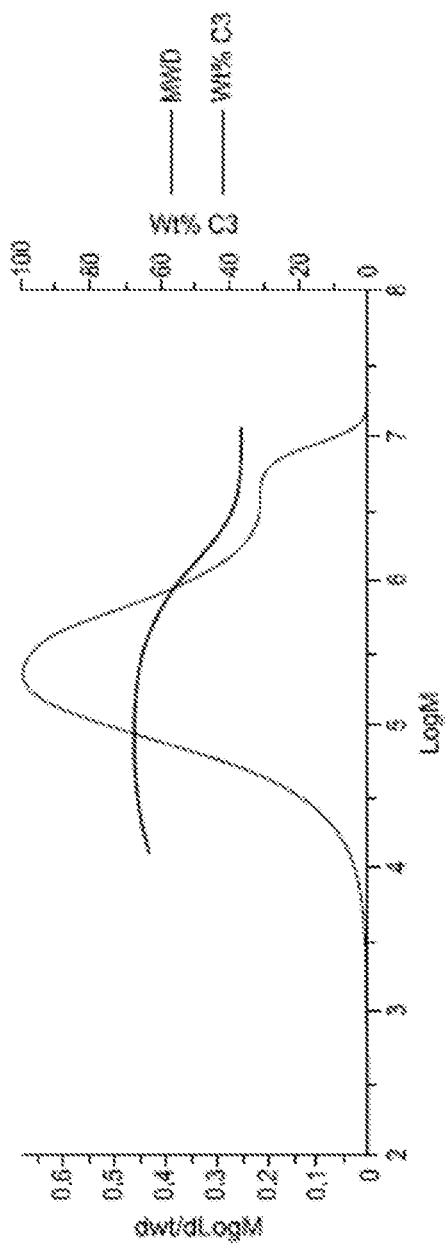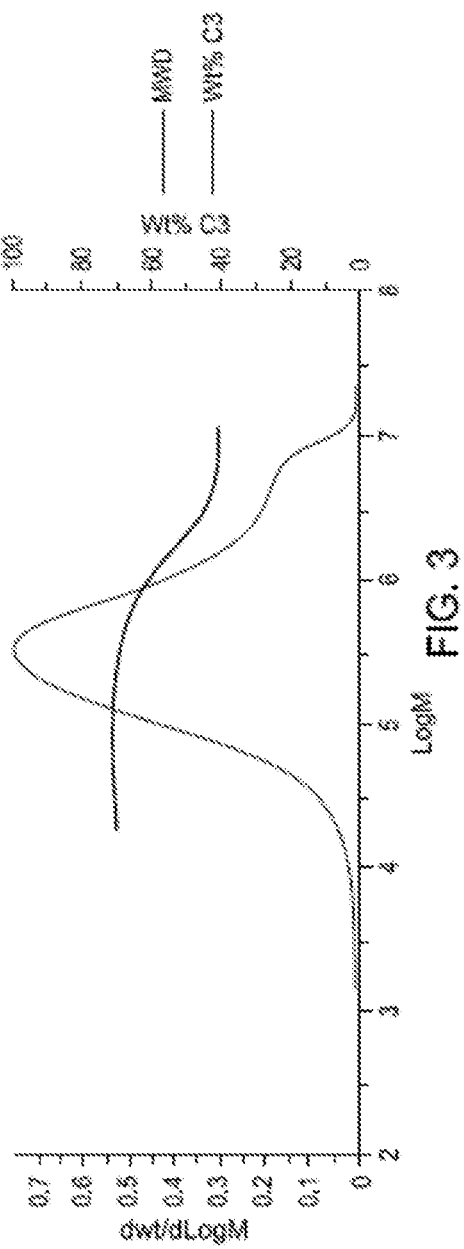

BIMODAL ETHYLENE, ALPHA-OLEFIN, AND DIENE POLYMERS USING DUAL ORGANOMETALLIC CATALYSTS

PRIORITY CLAIM

This application claims priority to and the benefit of U.S. Ser. No. 62/585,634, filed on Nov. 14, 2017 and is incorporated by reference in its entirety.

FIELD OF THE INVENTION

The present disclosure relates to methods of forming bimodal ethylene, alpha-olefin, and diene terpolymers using dual organometallic catalysts.

BACKGROUND OF THE INVENTION

Ethylene, propylene, diene terpolymers, also referred to as EPDM or EPDM rubbers, are thermoset rubbers characterized by high heat, ozone, and weather resistance, excellent electrical insulating properties and good resistance to polar substances and steam. The most common uses of EPDM rubbers are in vehicles as door, window, trunk, and hood seals, cooling system hoses, radiators, air chargers, among others. EPDM rubbers are also used as hoses, tubing, liners, washers, belts, insulators, vibrators, O-rings, and others. Dienes commonly used in the manufacture of EPDM include 5-ethylidene-2-norbornene (ENB), dicyclopentadiene (DCPD) and vinyl norbornene (VNB). The ethylene content in EPDM rubbers is typically from about 45% to about 85% by weight with diene content varying from about 1% to about 12%, depending on application needs. For EPDM rubbers to have sufficient elastic properties after vulcanization (or crosslinking), their weight average molecular weights should be greater than about 400,000, or their number average molecular weights greater than about 200,000. Higher elasticity and toughness can be achieved with higher molecular weight. Raising the molecular weight of an EPDM, although desirable to improve its rubber elasticity and toughness, increases its viscosity and renders it difficult to process. Hence, commercial high viscosity (or high Mooney) EPDMs are oil extended, meaning that process oils are added during manufacturing to improve their processability.

An improved approach has been to utilize bimodal EPDMs where the low molecular weight components offer processability and high molecular weight components offer elasticity and toughness.

Commercially, bimodal EPDMs are produced by serial reactors using a single catalyst where the molecular weight of each component is controlled by the two reactor temperatures. The EPDMs' high molecular weight components are typically below about 3,000,000 g/mol due to the catalyst and reactor temperature limitations (i.e., the reactor cannot be too cold to be economically viable).

In addition, conventional low activity Ziegler-Natta (ZN) vanadium catalysts cannot synthesize EPDM with majority propylene, or with ethylene content less than about 40 wt %. Similarly, conventional high activity metallocene catalysts can prepare EPDMs with majority propylene, but these catalysts suffer from a significant reduction in activity limiting their manufacturability. Therefore, there are no commercial EPDMs, whether from ZN catalysts or from metallocene (or post-metallocene) catalysts, that have ethylene content less than about 40 wt %.

Furthermore, polyolefins, such as polyethylene or polypropylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition.

Several EPDM applications—toughening polypropylene, providing ozone resistance for natural rubber (NR) or cis-butadiene rubber (BR) based tire sidewalls, or delivering elastic properties in thermoplastic blends—use EPDMs that are blended with polypropylene (PP) or with NR and thus it would be desirable to have a bimodal EPDM that is compatible with such materials.

There are several methods for producing bimodal or broad molecular weight distribution polyolefins, e.g., melt blending, reactors in series or parallel configuration, or single reactor with bimetallic catalysts. However, these methods, such as melt blending, suffer from the disadvantages brought by the need for complete homogenization of polyolefin compositions and high cost.

Furthermore, synthesizing these bimodal polyolefin compositions in a mixed catalyst system would involve a first catalyst to catalyze the polymerization of, for example, ethylene under substantially similar conditions as that of a second catalyst while not interfering with the catalysis of polymerization of the second catalyst. Interference with the polymerization catalysis of the other may result in reduced catalytic activity, reduced molecular weight, and reduced comonomer incorporation.

References of interest include: U.S. Pat. No. 6,528,670 B1; U.S. 2014/221587 A1; WO 2016/171809; and WO 2017/052847.

There is still a need in the art for new and improved catalyst systems for the polymerization of olefins, in order to achieve specific polymer properties, such as multimodal molecular weights, to increase conversion or lead to multimodal comonomer incorporation, or to alter comonomer distribution without deteriorating the resulting polymer's properties.

Further, a bimodal EPDM, with high molecular weight components having peak molecular weights exceeding about 3,000,000 g/mol, and with propylene being the majority comonomer in its lower molecular weight components, that is produced in a single reactor (without the need to construct serial reactors) using dual organometallic catalysts of high activities (without the need to de-ash or to remove residual catalysts, which is commonly required in vanadium catalyzed EPDMs) is also desired.

SUMMARY OF THE INVENTION

The present disclosure relates to methods for forming bimodal ethylene, alpha-olefin, and diene terpolymers using two or more organometallic catalysts. More specifically, the present disclosure relates to the synthesis of ethylene, propylene, diene terpolymers with multiple modalities (typically bimodality) in molecular weight and in composition using a mixture of bridged metallocene and pyridyldiamide transition metal catalysts, preferably a mixture of homogeneous catalysts.

This invention further relates to catalyst systems comprising:

A) a bridged biscyclopentadienyl transition metal compound comprising:
   i) at least one unsubstituted cyclopentadienyl ligand or aromatic fused-ring substituted cyclopentadienyl ligand,
   ii) one aromatic fused-ring substituted cyclopentadienyl ligand,
   iii) a transition metal bound to both cyclopentadienyl ligands, and
   iv) a bridge group connecting the two cyclopentadienyl ligands, said bridge having one or more carbon or silicon atoms; and
B) a transition metal pyridyldiamide compound represented by formula (I) or (II):

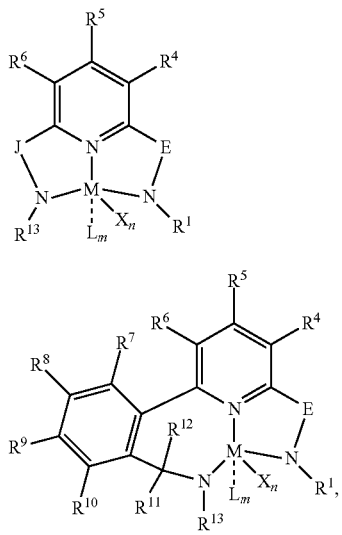

(I)

(II)

wherein:
M is a Group 3, 4, 5, 6, 7, 8, 9, or 10 metal (preferably M is Zr or Hf),
E is $C(R^2)$ or $C(R^3)(R^{3'})$,
X is an anionic leaving group (preferably X is methyl, hydrido, benzyl, neopentyl, trimethylsilylmethyl, chloride, bromide, fluoride, iodide, propyl, ethyl, hexyl, triflate, more preferably methyl, chloride, or dialkylamido),
L is a neutral Lewis base (preferably L is ether, amine, phosphine, or thioether),
$R^1$ and $R^{13}$ are independently selected from substituted or unsubstituted hydrocarbyl or silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group that is unsubstituted in the 2 and 6 positions),
$R^2$ is a group containing 1-10 carbon atoms that is optionally joined with $R^4$ to form an aromatic ring (preferably $R^2$ & $R^4$ are joined to form a six membered aromatic ring), $R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino (preferably $R^3$ & $R^{3'}$ are hydrogen),
J is a divalent group that forms a three-atom-length bridge between the pyridine ring and the amido nitrogen (preferably J is selected from:

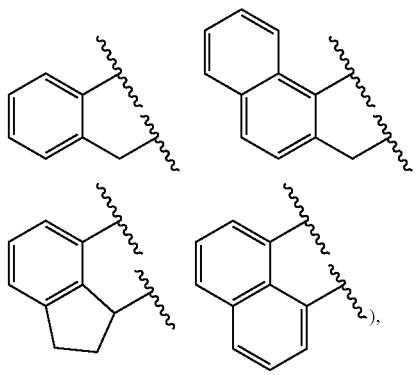

n is 1 or 2,
m is 0, 1, or 2, and
two X groups may be joined to form a dianionic group,
two L groups may be joined to form a bidentate Lewis base,
an X group may be joined to an L group to form a monoanionic bidentate group,
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined to form cyclopentyl or cyclohexyl, preferably $R^{10}$ & $R^{11}$ are joined to form a five- or six-membered ring, preferably $R^{10}$ & $R^{11}$ are joined to form cyclopentyl or cyclohexyl).

This invention also relates to the above catalyst systems further comprising a bridged or unbridged metallocene catalyst compound other than the bridged biscyclopentadienyl compound of A), a transition metal pyridyldiamide compound other than the transition metal pyridyldiamide compound of A), or combinations thereof.

In another embodiment, the catalyst system further includes an activator and/or a support material.

In another embodiment, a method of polymerizing olefins to produce at least one polyolefin composition is provided. The method includes contacting at least one olefin with a catalyst system of the present disclosure; and obtaining a polyolefin.

In another embodiment, an ethylene, alpha-olefin, diene copolymer is provided. In particular, the catalysts and catalyst systems described herein provide bimodal polymers, such as bimodal EPDMs. The copolymers preferably include a high molecular weight component and a low molecular component, wherein the high molecular weight component is present at less than about 20 wt %, based upon the weight of the copolymer. The polymers, such as EPDMs, preferably contain less than 20 wt % of a high molecular weight component, where the high MW component has a peak molecular weight of 2,000,000 g/mol or more (preferably 3,000,000 g/mol or more) and the ethylene content of the high MW component is 40 wt % or more, based upon the weight of the copolymer. The polymers, such as EPDMs, preferably contain greater than 80 wt % of a low molecular weight component, where the low MW component has a peak molecular weight of less than 2,000,000 g/mol and ethylene content of less than 40 wt %, based upon the weight of the copolymer.

BRIEF DESCRIPTION OF THE FIGURES

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

FIG. 2 is a representative plot of dWt/d Log M versus Log M and a plot of propylene incorporation (C3 wt %) versus Log M for Example 2.

FIG. 3 is a representative plot of dWt/d Log M versus Log M and a plot of propylene incorporation (C3 wt %) versus Log M for Example 3.

DETAILED DESCRIPTION

Figure 1:
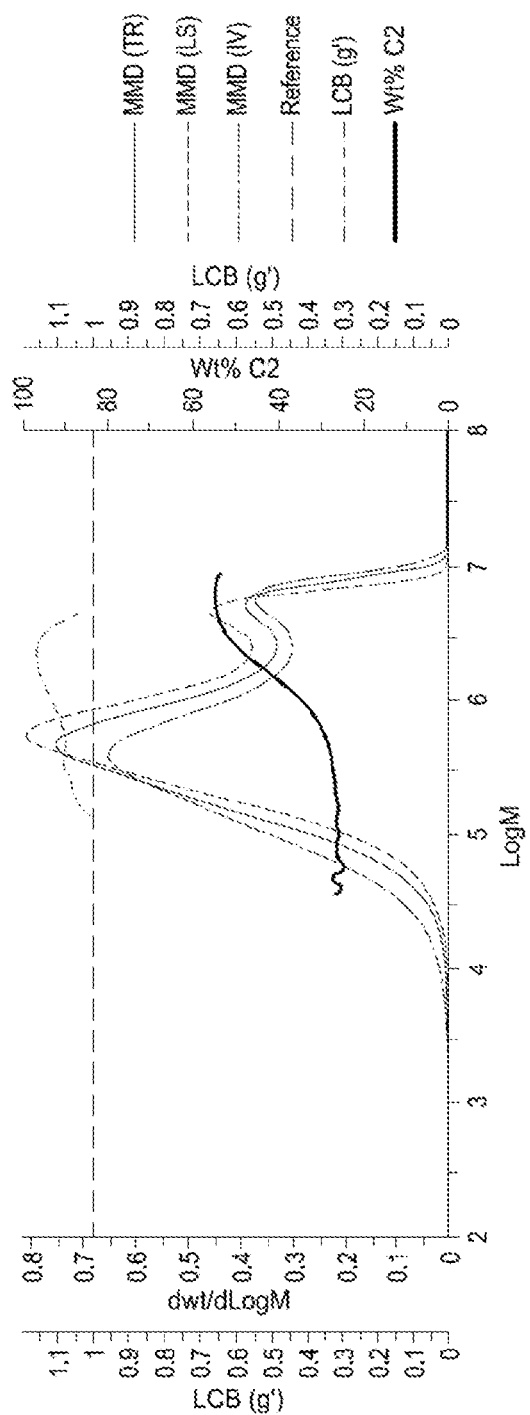
FIG. 1 is a representative plot of LCB (g') versus Log M, dWt/d log M (including the infrared measured MW (TR), light scattering measured MW (LS), and intrinsic viscosity measured MW (IV)) versus Log M, and ethylene incorporation (C2 wt %) versus Log M for Example 1.

Catalyst systems of the present disclosure include at least one bridged metallocene compound and at least one transition metal pyridyldiamide compound. This invention also relates to catalysts, catalyst systems and methods to provide bimodal polymers, such as EPDMs, where the low MW components are the majority components of the polymers, and the low MW components contain majority propylene.

As used herein, "high molecular weight" or "high MW" is defined as a molecular weight, MW, value of 2,000,000 g/mol or more as determined by Gel Permeation Chromatography (GPC). As used herein "low molecular weight" or "low MW" is defined as molecular weight, MW, value of less than 2,000,000 g/mol as determined by GPC. The high MW component and low MW component in the polymer are determined by plotting the GPC curve (dWt/d Log M versus Log M), identifying the 2,000,000 g/mol point on the abscissa (Log M), drawing a line straight up (90 degrees) from 2,000,000 g/mol point on the abscissa and using that line to divide the GPC curve into the high MW component and the low MW component. The weight percent of the high and low MW components are then calculated by integrating the areas under the GPC curve separately.

Preferably, the polymer produced herein is an EPDM copolymer containing:
1) 0.1 to 20 wt % of a high molecular weight component having a peak molecular weight of 2,000,000 g/mol (preferably 3,000,000 g/mol) or more and an ethylene content of 40 wt % or more; and
2) 80 to 99.9 wt % of a low molecular weight component having a peak molecular weight of less than 2,000,000 g/mol and an ethylene content less than 40 wt %. Since EPDMs with more propylene would have higher Tg, it is desirable to have greater than about 40 wt % ethylene in the high MW components of a bimodal EPDM for lower Tg and better elasticity. Such compositions allow for high elasticity, toughness, and processability.

For example, useful bimodal polyolefin compositions include a first polyolefin having low molecular weight and high comonomer content (i.e., comonomer, such as propylene, incorporated into the polyolefin backbone) while a second polyolefin has a high molecular weight and low comonomer content. As used herein, "low comonomer content" is defined as a polyolefin having about 60 wt % or less of comonomer based upon the total weight of the polyolefin. The high molecular weight fraction produced by the second catalyst compound may have a high comonomer content. As used herein, "high comonomer content" is defined as a polyolefin having greater than 60 wt % of comonomer based upon the total weight of the polyolefin.

The compositions described herein provide for useful amounts of lower ethylene content for several EPDM applications. For example, where EPDMs are used to toughen polypropylene, to provide ozone resistance for natural rubber (NR) or cis-butadiene rubber (BR) based tire sidewalls, or to deliver elastic properties in thermoplastic blends, the EPDMs are blended with polypropylene (PP) or with NR. In such cases, it is preferred that EPDMs have majority propylene for better compatibility with PP or with NR thus allowing them to be finely dispersed in PP or in NR for higher interfacial areas and better mechanical performance. If a bimodal EPDM is used, it is preferred that the low MW components to have majority propylene instead of the high MW components and the low MW components are used as the compatibilizers in blending with PP and NR. Since EPDMs with more propylene would have higher Tg, it is desirable to have greater than 40 wt % ethylene content in the high MW components of a bimodal EPDM for lower Tg and better elasticity.

It has been found that a mixture of highly active bridged metallocene and non-metallocene pyridyldiamide transition metal catalysts (preferably homogeneous catalysts) directs the synthesis of bimodal polymers, such as EPDMs, having the aforementioned desired properties. In some embodiments, the catalyst systems use a mixture of metallocene and pyridyldiamide transition metal at a molar ratio of about 0.5 to about 2.0 in a single solution reactor. In some embodiments, the prepared bimodal ethylene polymer contains 0.1 to 20 wt % of a high molecular weight component having a peak molecular weight greater than about 3,000,000 g/mol and an ethylene content greater than 40 wt %, and 80 to 99 wt % of a low molecular weight component, having a peak molecular weight less than about 1,000,000 g/mol and ethylene content of less than 40 wt %.

The catalysts, catalyst systems and the methods of the present disclosure offer several advantages over conventional techniques. The preferred molecular weight split ratio provides excellent processability and the preferred composition split ratio provides excellent elasticity and compatibility with polypropylene (PP) thereby allowing these bimodal terpolymers to be used as, for example, neat thermoset rubbers, PP toughening rubber additives.

Moreover, due to the bimodal composition of the EPDMs, process oils do not need to be added to improve processability. In addition, there is no need to use serial reactors since the present disclosure offers a dual catalyst system, preferably used in one reactor to produce the bimodal EPDM.

For purposes herein, the numbering scheme for the Periodic Table Groups is used as described in CHEMICAL AND ENGINEERING NEWS, 63(5), pg. 27 (1985). For example, a "group 4 metal" is an element from group 4 of the Periodic Table, e.g., Hf, Ti, or Zr.

"Catalyst productivity" is a measure of how many grams of polymer (P) are produced using a polymerization catalyst including W g of catalyst (cat), over a period of time of T hours; and may be expressed by the following formula: P/(T×W) and expressed in units of gPgcat$^{-1}$ h$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

As used herein, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the monomer ("mer") unit in the copolymer is derived from ethylene in the polymerization reaction and said derived units are present at 35 wt % to 55 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer having at least 50 mole % ethylene derived units, a "propylene polymer" or "propylene copolymer" is a polymer or copolymer having at least 50 mole % propylene derived units, and so on.

For the purposes of this disclosure, ethylene shall be considered an α-olefin.

As used herein, MW is molecular weight, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., MW, Mw, Mn, Mz) are g/mol.

The following abbreviations may be used herein: Me is methyl, Et is ethyl, Pr is propyl, cPr is cyclopropyl, nPr is normal propyl, iPr is isopropyl, Bu is butyl, nBu is normal butyl, iBu is isobutyl, sBu is sec-butyl, tBu is tert-butyl, p-tBu is para-tert-butyl, Ph is phenyl, Bn is benzyl (i.e., $CH_2Ph$), Oct is octyl, Cy is cyclohexyl, TIBAL is triisobutylaluminum, TNOAL is tri(n-octyl)aluminum, MAO is methylalumoxane, THF (also referred to as the is tetrahydrofuran, RT is room temperature (unless otherwise indicated, room temperature is 23° C.), tol is toluene, and EtOAc is ethyl acetate.

As used herein, a "catalyst system" includes at least two catalyst compounds, an optional activator, an optional co-activator, and an optional support material. For the purposes of this disclosure and claims thereto, when catalyst systems are described as comprising neutral stable forms of the components, it is well understood by one of ordinary skill in the art, that the ionic form of the component is the form that reacts with the monomers to produce polymers. Furthermore, catalysts of the present disclosure represented by a Formula are intended to embrace ionic forms thereof of the compounds in addition to the neutral stable forms of the compounds.

"Linear" means that the polymer has few, if any, long chain branches and typically has a g'vis value of 0.97 or above, such as 0.98 or above.

The term "cyclopentadienyl" refers to a 5-member ring having delocalized bonding within the ring and typically being bound to M through $\eta^5$-bonds, carbon typically making up the majority of the 5-member positions.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and co-catalyst are also used interchangeably.

Unless otherwise indicated, the term "substituted" means that a hydrogen group has been replaced with a hydrocarbyl, a heteroatom, or a heteroatom-containing group. Substituted radicals are radicals in which at least one hydrogen atom of the radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a ring.

A scavenger is a compound that can be added to a reactor to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include, but are not limited to, trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl" or "unsubstituted hydrocarbyl" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like. Substituted hydrocarbyl is a radical in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like. Preferred "alkoxides" include those where the alkyl group is a $C_1$ to $C_{10}$ hydrocarbyl, such as $C_1$ to $C_{10}$ alkyl or $C_5$ to $C_{20}$ aryl. The alkyl group may be straight chain, branched, or cyclic. The alkyl group may be saturated or unsaturated. In some embodiments, the alkyl group may include at least one aromatic group.

The term "aryl" or "aryl group" includes a $C_4$-$C_{20}$ aromatic ring, such as a six carbon aromatic ring, and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Catalyst Compounds

In at least one embodiment, the present disclosure relates to a multiple (typically dual) catalyst system. The multiple (typically dual) catalyst system comprises a transition metal pyridyldiamide compound and a bridged metallocene compound.

Typically, transition metal pyridyldiamide catalysts are useful for ultrahigh Mw copolymers, such as high Mw EPDM. Particularly useful transition metal pyridyldiamide catalysts herein are described in U.S. Publication No. 2014/0256893 and are incorporated herein by reference. Typically, bridged metallocenes provide moderate (e.g., 75,000 g/mol Mw or more) Mw polymer, such as moderate Mw EPDM having majority propylene. The bridged metallocenes typically contain a Group 4 transition metal, preferably hafnium or zirconium. Particularly useful bridged bis-cyclopentadienyl hafnium complexes are those described in U.S. Pat. Nos. 6,559,253 and 6,528,670, the disclosures of which are incorporated herein by reference. The bridged hafnocenes described in WO 96/33227, WO 97/22635, and EP 0 612 768 are additionally suitable, the description and examples of these documents are incorporated by reference herein.

Transition Metal Pyridyldiamide Compound

Preferably, the transition metal pyridyldiamide catalyst component is represented by formulas (I) or (II):

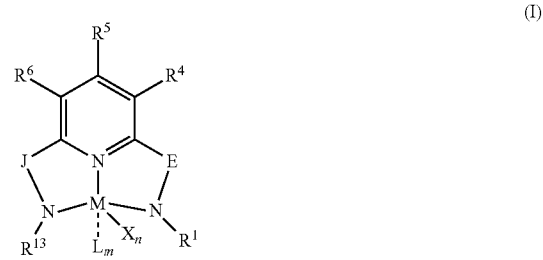

(I)

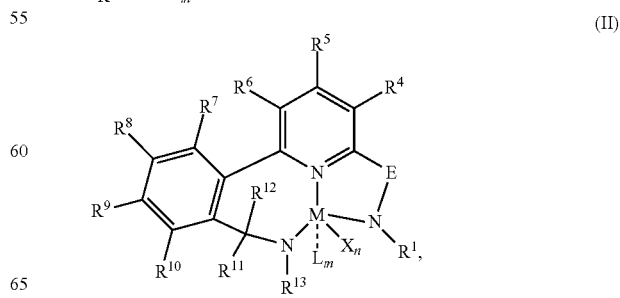

(II)

wherein:

M is a Group 3, 4, 5, 6, 7, 8, 9, or 10 metal (preferably M is Zr or Hf);

E is $C(R^2)$ or $C(R^3)(R^{3'})$;

X is an anionic leaving group (preferably X is $C_1$ to $C_{12}$ alkyl (such as methyl, ethyl, propyl, butyl, pentyl, hexyl, octyl, nonyl, decyl, undecyl, dodecyl, or isomers thereof, such as iso-, tert-, n-, sec-), hydrido, benzyl, neopentyl, trimethylsilylmethyl, halogen (such as chloride, bromide, fluoride, iodide), triflate, more preferably methyl, chloride, or dialkylamido);

L is a neutral Lewis base (preferably L is ether, amine, phosphine, or thioether);

$R^1$ and $R^{13}$ are independently selected from substituted or unsubstituted hydrocarbyl or silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group that is unsubstituted in the 2 and 6 positions);

$R^2$ is a group containing 1-10 carbon atoms that is optionally joined with $R^4$ to form an aromatic ring (preferably $R^2$ & $R^4$ are joined to form a six membered aromatic ring);

$R^3$, $R^{3'}$, $R^4$, $R^5$, $R^6$, $R^7$, $R^8$, $R^9$, $R^{10}$, $R^{11}$, and $R^{12}$ are each independently selected from hydrogen, substituted or unsubstituted hydrocarbyl, alkoxy, silyl, amino, aryloxy, halogen, and phosphino (preferably $R^3$ & $R^{3'}$ are hydrogen);

J is a divalent group that forms a three-atom-length bridge between the pyridine ring and the amido nitrogen (preferably J is selected from:

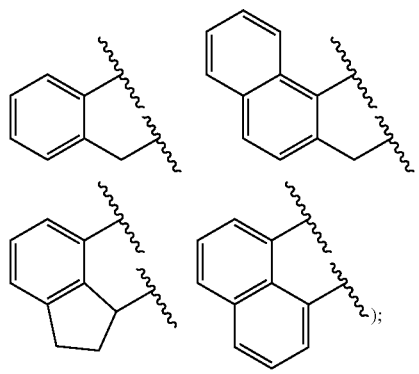

);

n is 1 or 2;

m is 0, 1, or 2; and two X groups may be joined to form a dianionic group;

two L groups may be joined to form a bidentate Lewis base;

an X group may be joined to an L group to form a monoanionic bidentate group;

adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined to form cyclopentyl or cyclohexyl, preferably $R^{10}$ & $R^{11}$ are joined to form a five- or six-membered ring, preferably $R^{10}$ & $R^{11}$ are joined to form cyclopentyl or cyclohexyl).

Even more preferably, the transition metal pyridyldiamide catalyst component is represented by formula (III):

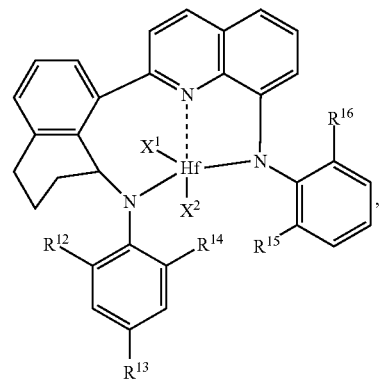

(III)

wherein:

each of $R^{12}$, $R^{13}$, $R^{14}$, $R^{15}$, and $R^{16}$ is independently hydrogen, methyl, ethyl, propyl, isopropyl, isobutyl, or tertbutyl, and each of $X^1$ and $X^2$ is independently halogen or alkyl (preferably F, Cl, Br, I, methyl, ethyl, propyl, butyl, pentyl, hexyl, octyl, nonyl, decyl, undecyl, dodecyl, or isomers thereof, such as iso-, tert-, n-, sec-).

Non-limiting embodiments of transition metal pyridyldiamides useful for the catalyst systems described herein include one or more of (1) to (8) below:

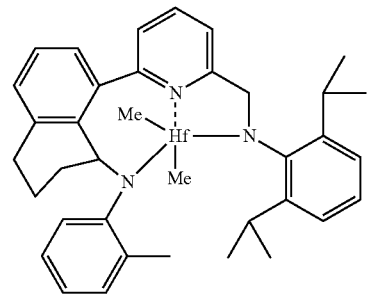

(1)

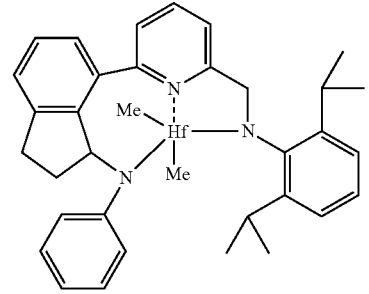

(2)

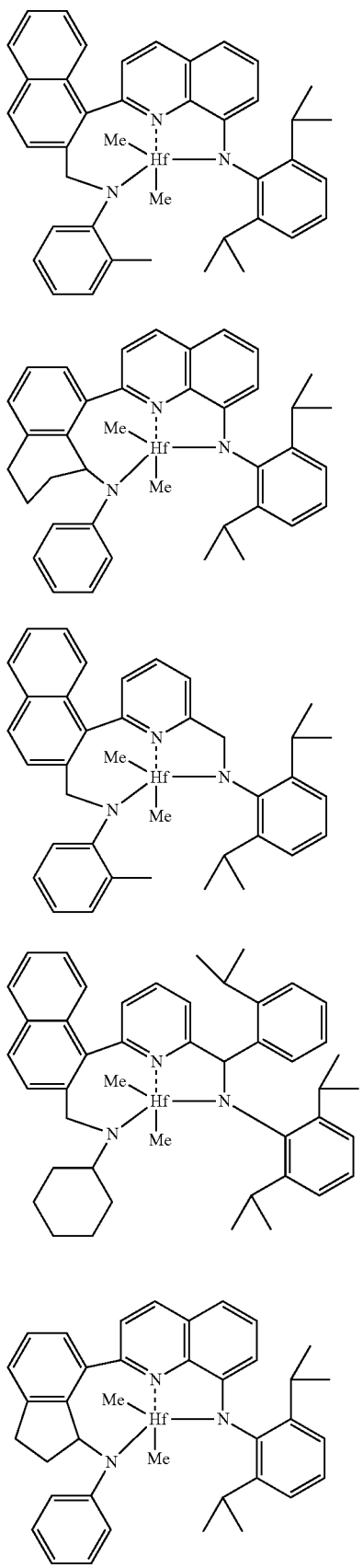

(3)

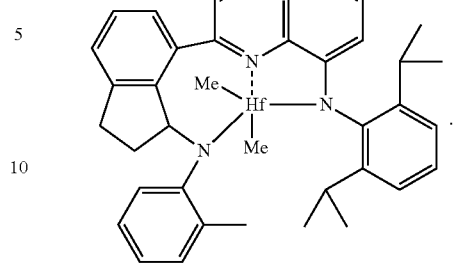

(8)

Bridged Metallocene Compounds

The bridged metallocene compounds are preferably bridged biscyclopentadienyl hafnium or zirconium compounds. These bridged biscyclopentadienyl hafnium or zirconium compounds of the present disclosure include those compounds having one substituted or unsubstituted carbon or substituted silicon atom bridging two cyclopentadienyl (Cp) ligands of the metal centers, the aromatic fused-ring substituted cyclopentadienyl ligand or ligands optionally containing substituents on the non-cyclopentadienyl aromatic rings selected from $C_1$-$C_{20}$ hydrocarbyl or hydrocarbylsilyl substituents. Substituents typically include one or more $C_1$ to $C_{30}$ hydrocarbon or hydrocarbylsilyl groups that can be linear, branched, cyclic, aliphatic, aromatic or combined groups, whether in a fused-ring or pendant configuration. Examples include methyl, isopropyl, n-propyl, n-butyl, isobutyl, tertiary butyl, neopentyl, phenyl, and benzyl. "Hydrocarbylsilyl" is exemplified by, but not limited to, $CH_2$—$SiR^*_3$, (where $R^*$ is $C_1$ to $C_{10}$ alkyl, such as methyl), trimethylsilyl and triethylsilyl. Similarly the use of heteroatom containing cyclopentadienyl rings or fused ring, where a non-carbon Group 14 or 15 atom replaces one of the ring carbons in the Cp ring or in a fused ring, is considered for this specification to be within the terms "cyclopentadienyl", "indenyl", and "fluorenyl".

Particularly useful bridged biscyclopentadienyl compounds can be represented by the formula:

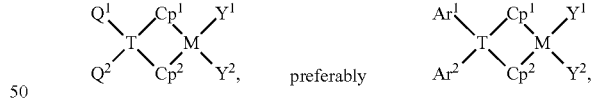

wherein:

M is zirconium or hafnium, preferably hafnium;

each of $Cp^1$ and $Cp^2$ is independently a substituted or unsubstituted cyclopentadienyl-containing group;

T is a Group 14 element containing bridging group, preferably comprising one or more carbon or silicon atoms;

each of $Y^1$ and $Y^2$ is independently an anionic leaving group;

each of $Q^1$ and $Q^2$ is independently a substituted or unsubstituted hydrocarbyl group; and each of $Ar^1$ and $Ar^2$ is independently a substituted or unsubstituted aryl group.

As illustrative non-limiting examples, $Ar^1$ and $Ar^2$ may be independently:

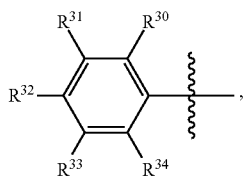

wherein each of $R^{30}$, $R^{31}$, $R^{32}$, $R^{33}$, and $R^{34}$ may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —NR'$_2$, —SR', —OR', —OSiR'$_3$, —PR'$_2$, where each R' is hydrogen, halogen, $C_1$-$C_{10}$ alkyl, or phenyl.

As illustrative non-limiting examples, $Q^1$ and $Q^2$ may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —NR'$_2$, —SR', —OR', —OSiR'$_3$, —PR'$_2$, where each R' is hydrogen, halogen, $C_1$-$C_{10}$ alkyl, or phenyl.

As illustrative, non-limiting examples, each of $Cp^1$ and $Cp^2$ may be independently unsubstituted cyclopentadienyl, substituted cyclopentadienyl, unsubstituted indenyl, substituted indenyl, unsubstituted fluorenyl, or substituted fluorenyl.

As illustrative non-limiting examples, $Y^1$ and $Y^2$ may be independently hydrogen, halide, hydroxyl, or $C_1$-$C_{50}$ substituted or unsubstituted hydrocarbyl, amide, alkoxide, sulfide, phosphide, halide, or a combination thereof, or $Y^1$ and $Y^2$ are joined together to form a metallocycle ring, or $Y^1$ and $Y^2$ are joined to form a chelating ligand, or an alkylidene, (preferably each of $Y^1$ and $Y^2$ is independently a $C_1$ to $C_{12}$ alkyl (such as methyl, ethyl, propyl, butyl, pentyl, hexyl, octyl, nonyl, decyl, undecyl, dodecyl, or isomers thereof, such as iso-, tert-, n-, sec-), hydrido, benzyl, neopentyl, trimethylsilylmethyl, halogen (such as chloride, bromide, fluoride, iodide), triflate, more preferably methyl, chloride, or dialkylamido).

In a preferred embodiment of the invention in any embodiment of any formula described herein, T is a bridging group comprising Si, Ge, or C, preferably T is dialkyl silicon or dialkyl germanium, preferably T is dimethyl silicon.

In a preferred embodiment of the invention in any embodiment of any formula described herein, T is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR—CR'$_2$, where each R is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent. Preferably, T is $CH_2$, $CH_2CH_2$, $C(CH_3)_2$, $SiMe_2$, $SiPh_2$, $SiMePh$, silylcyclobutyl ($Si(CH_2)_3$), $(Ph)_2C$, $(p-(Et)_3SiPh)_2C$, cyclopentasilylene ($Si(CH_2)_4$), or $Si(CH_2)_5$.

Specific bridged biscyclopentadienyl compounds include those derived from: (1) indenyl-based complexes such as the rac- or meso-isomer, or mixtures, of dimethylsilyl bis(indenyl)hafnium dimethyl, dimethylsilyl bis(2-methyl-indenyl) hafnium dimethyl, dimethylsilyl bis(2-propyl-indenyl)hafnium dimethyl, dimethylsilyl bis(4-methyl, 2-phenyl-indenyl)hafnium dimethyl, or methylene(indenyl)(2,7-di-tertbutyl-fluorenyl)hafnium dimethyl, and diphenylmethylene(indenyl)(2,7-bis tert-butylfluorenyl)hafnium dibenzyl; (2) fluorenyl-based complexes such as dibutylsilyl(fluorenyl)(cyclopentadienyl)hafnium dimethyl, dimethylsilyl(indenyl)(fluorenyl) hafnium dihydride, i-propyl (cyclopentadienyl)(fluorenyl)hafnium dimethyl, dinapthylmethylene(cyclopentadienyl)(fluorenyl)hafnium dimethyl, diphenylmethylene(2,7-di tertbutyl, 5-methyl-fluorenyl)(cyclopentadienyl)hafnium dimethyl, diphenylmethylene(2,7-di para-n-butyl-fluorenyl)(cyclopentadienyl) hafnium dimethyl, diphenylmethylene (cyclopentadienyl)(2,7-dimethylfluorenyl)hafnium dimethyl, diphenylmethylene (cyclopentadienyl)(2,7-di-tertbutyl-fluorenyl)hafnium dimethyl, methylene (2,7-di-tertbutylfluorenyl)(fluorenyl)hafnium dimethyl, diphenylmethylene(2,7-di-tertbutylfluorenyl) (fluorenyl) hafnium dimethyl, methylene bis(fluorenyl) hafnium dimethyl, or methylphenylmethylene bis(fluorenyl) hafnium dimethyl; and (3) cyclopentadienyl-based complexes such as the rac- or meso-isomer, or mixtures of (para-trimethylsilylphenyl)(para-n-butylphenyl)methylene (fluorenyl)(cyclopentadienyl)hafnium dimethyl, di(para-trimethylsilylphenyl)methylene(2,7-di-tertbutylfluorenyl) (cyclopentadienyl)hafnium dimethyl, di(para-trimethylsilylphenyl)methylene(2,7-di-tertbutyl-fluorenyl) (cyclopentadienyl)hafnium dimethyl, (para-trimethylsilylphenyl) (para-t-butylphenyl)methylene(2,7-di tertbutyl fluorenyl)(cyclopentadienyl)hafnium dimethyl or dibenzyl, di(para-trimethylsilylphenyl)methylene(2,7-dimethylfluorenyl)(cyclopentadienyl)hafnium dimethyl or dibenzyl, and bis(p-triethylsilylphenyl)carbyl(cyclopentadienyl) (2,7-di-t-butylfluorenyl)hafnium dimethyl.

Other useful bridged biscyclopentadienyl compounds include: diphenyl methylene (cyclopentadienyl)(9-fluorenyl)hafnium dimethyl, diphenyl methylene (cyclopentadienyl)(2,7-dimethyl-9-fluorenyl)hafnium dimethyl, diphenyl methylene (cyclopentadienyl)(2,7-di-tert-butyl-9-fluorenyl) hafnium dimethyl, di(p-trimethylsilyl-phenyl)methylene (cyclopentadienyl)(fluorenyl)hafnium dimethyl, di(p-trimethylsilyl-phenyl)methylene (cyclopentadienyl)(2,7-dimethyl-9-fluorenyl)hafnium dimethyl, di(p-trimethylsilyl-phenyl)methylene(cyclopentadienyl)(2,7-di-tert-butyl-9-fluorenyl)hafnium dimethyl, di(p-triethylsilyl-phenyl) methylene(cyclopentadienyl)(fluorenyl)hafnium dimethyl, di(p-triethylsilyl-phenyl)methylene(cyclopentadienyl) (2,7-dimethyl-9-fluorenyl)hafnium dimethyl, di(p-triethylsilyl-phenyl)methylene (cyclopentadienyl)(2,7-di-tert-butyl-9-fluorenyl)hafnium dimethyl, (p-triethylsilyl-phenyl)(p-tert-butylphenyl)methylene(cyclopentadienyl)(fluorenyl) hafnium dimethyl, (p-triethylsilyl-phenyl))(p-n-butylphenyemethylene(cyclopentadienyl)(2,7-dimethyl-9-fluorenyl)hafnium dimethyl, (p-trimethylsilylphenyl)(p-n-butylphenyl)methylene(cyclopentadienyl) (2,7-di-tert-butyl-9-fluorenyl)hafnium dimethyl, and (p-triethylsilyl-phenyl)(p-n-butylphenyl)methylene (cyclopentadienyl)(2,7-dimethyl-9-fluorenyl)hafnium dimethyl.

It has been found that the asymmetric, bridged compounds, such as those listed above, are particularly useful in accordance with the current disclosure.

In particular, for the bridged hafnium compounds, it is thought that increasing the degree of substitution on the aromatic fused-ring substituted ligand contributes increased molecular weight, as is the use of covalent bridges between the cyclopentadienyl ligands having a substituted or unsubstituted carbon atom (—CH$_2$—, or —CHR—, or —CR$_2$—) or substituted silylene (—SiR$_2$—) bridging unit, where each R may be the same or different C$_1$ to C$_{20}$ hydrocarbyl substituent, or where the two R's may be covalently linked to form a cyclic structure. Preferably, the substitution on the indenyl, fluorenyl or azulenyl radicals in the hafnium compounds will generally comprise two or more C$_1$ to C$_{30}$ hydrocarbon substituents on a 6-member fused-ring as defined above.

This invention further relates to a catalyst system comprising at least one of the bridged biscyclopentadienyl compounds described above, at least one of the transition metal pyridyldiamide compounds described above, an optional activator, optional co-activator, and optional support.

In at least one embodiment, the present disclosure provides a catalyst system comprising:
A) a bridged biscyclopentadienyl compound comprising:
   i) at least one unsubstituted cyclopentadienyl ligand or aromatic fused-ring substituted cyclopentadienyl ligand;
   ii) one aromatic fused-ring substituted cyclopentadienyl ligand;
   iii) a transition metal bound to both cyclopentadienyl ligands;
   iv) a bridge group connecting the two cyclopentadienyl ligands, said bridge having one or more carbon or silicon atoms; and
B) a transition metal pyridyldiamide compound represented by formula (I) or (II):

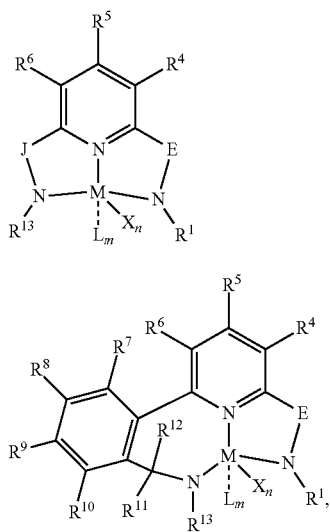

wherein:
M is a Group 3, 4, 5, 6, 7, 8, 9, or 10 metal (preferably M is Zr or Hf);
E is C(R$^2$) or C(R$^3$)(R$^{3'}$);
X is an anionic leaving group (preferably X is methyl, hydrido, benzyl, neopentyl, trimethylsilylmethyl, chloride, bromide, fluoride, iodide, propyl, ethyl, hexyl, triflate, more preferably methyl, chloride, or dialkylamido);
L is a neutral Lewis base (preferably L is ether, amine, phosphine, or thioether);
R$^1$ and R$^{13}$ are independently selected from substituted or unsubstituted hydrocarbyl or silyl groups (preferably R$^1$ & R$^{13}$ are aryl groups, preferably R$^1$ is 2,6-disubstituted aryl, preferably R$^1$ is 2,6-diisopropylphenyl, preferably R$^{13}$ is 2-substituted aryl, preferably R$^{13}$ is phenyl, preferably R$^1$ is 2,6-disubstituted aryl group and R$^{13}$ is an aryl group that is unsubstituted in the 2 and 6 positions);
R$^2$ is a group containing 1-10 carbon atoms that is optionally joined with R$^4$ to form an aromatic ring (preferably R$^2$ & R$^4$ are joined to form a six membered aromatic ring);
R$^3$, R$^{3'}$, R$^4$, R$^5$, R$^6$, R$^7$, R$^8$, R$^9$, R$^{10}$, R$^{11}$, and R$^{12}$ are each independently selected from hydrogen, substituted or unsubstituted hydrocarbyl, alkoxy, silyl, amino, aryloxy, halogen, and phosphino (preferably R$^3$ & R$^{3'}$ are hydrogen);
J is a divalent group that forms a three-atom-length bridge between the pyridine ring and the amido nitrogen (preferably J is selected from:

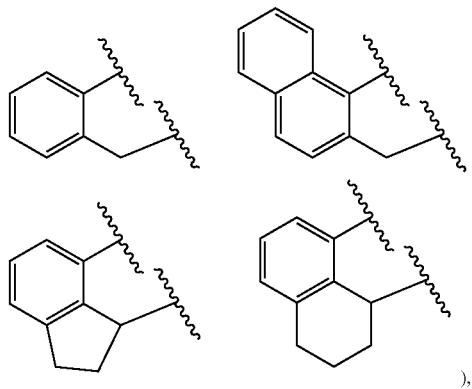

), n is 1 or 2;
m is 0, 1, or 2;
two X groups may be joined to form a dianionic group;
two L groups may be joined to form a bidentate Lewis base;
an X group may be joined to an L group to form a monoanionic bidentate group; and
adjacent groups from the following R$^3$, R$^{3'}$, R$^4$, R$^5$, R$^6$, R$^7$, R$^8$, R$^9$, R$^{10}$, R$^{11}$, and R$^{12}$ may be joined to form a ring (preferably R$^7$ & R$^8$ are joined to form an aromatic ring, preferably R$^7$ & R$^8$ are joined to form cyclopentyl or cyclohexyl, preferably R$^{10}$ & R$^{11}$ are joined to form a five- or six-membered ring, preferably R$^{10}$ & R$^{11}$ are joined to form cyclopentyl or cyclohexyl).

In at least one embodiment, M is hafnium.
In at least one embodiment, M is zirconium.
In at least one embodiment, the bridge is a single carbon or silicon atom.
In at least one embodiment, the aromatic fused-ring substituted cyclopentadienyl ligand is a substituted or unsubstituted fluorenyl ligand.
In at least one embodiment, the bridge group of the bridged biscyclopentadienyl compound is a substituted or unsubstituted carbon atom.
In at least one embodiment, the bridged atom is substituted with at least one aryl group.
In at least one embodiment, the bridged biscyclopentadienyl compound is at least one of: diphenyl methylene (cyclopentadienyl)(9-fluorenyl)hafnium dimethyl, diphenyl methylene (cyclopentadienyl)(2,7-dimethyl-9-fluorenyl) hafnium dimethyl, diphenyl methylene (cyclopentadienyl)

(2,7-di-tert-butyl-9-fluorenyl)hafnium dimethyl, di(p-trimethylsilyl-phenyl)methylene(cyclopentadienyl)(fluorenyl) hafnium dimethyl, di(p-trimethylsilyl-phenyl)methylene (cyclopentadienyl)(2,7-dimethyl-9-fluorenyl)hafnium dimethyl, di(p-trimethylsilyl-phenyl)methylene(cyclopentadienyl) (2,7-di-tert-butyl-9-fluorenyl)hafnium dimethyl, di(p-triethylsilyl-phenyl)methylene(cyclopentadienyl)(fluorenyl) hafnium dimethyl, di(p-triethylsilyl-phenyl)methylene (cyclopentadienyl)(2,7-dimethyl-9-fluorenyl)hafnium dimethyl, di(p-triethylsilyl-phenyl)methylene (cyclopentadienyl)(2,7-di-tert-butyl-9-fluorenyl)hafnium dimethyl, (p-triethylsilyl-phenyl)(p-tert-butylphenyl)methylene(cyclopentadienyl)(fluorenyl)hafnium dimethyl, (p-triethylsilyl-phenyl))(p-n-butylphenyemethylene(cyclopentadienyl) (2,7-dimethyl-9-fluorenyl)hafnium dimethyl, (p-trimethylsilylphenyl)(p-n-butylphenyl)methylene(cyclopentadienyl) (2,7-di-tert-butyl-9-fluorenyl)hafnium dimethyl, and (p-triethylsilyl-phenyl)(p-n-butylphenyl)methylene (cyclopentadienyl)(2,7-dimethyl-9-fluorenyl)hafnium dimethyl.

In at least one embodiment, the bridged biscyclopentadienyl compound is:

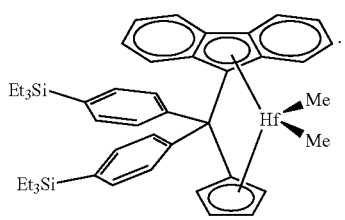

In at least one embodiment, the bridge group of the bridged biscyclopentadienyl compound is a substituted silicon atom.

In at least one embodiment, the catalyst system includes a transition metal pyridyldiamide compound represented by formula (III):

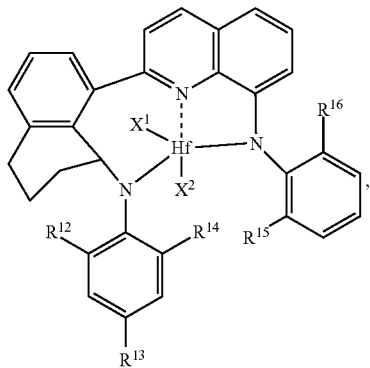

(III)

wherein:
each of $R^{12}$, $R^{13}$, $R^{14}$, $R^{15}$, and $R^{16}$ is independently hydrogen, methyl, ethyl, propyl, isopropyl, isobutyl, or tertbutyl, and
each of $X^1$ and $X^2$ is independently halogen or alkyl.

In at least one embodiment, the catalyst system preferably includes one or more of the following transition metal pyridyldiamide compounds (1)-(8):

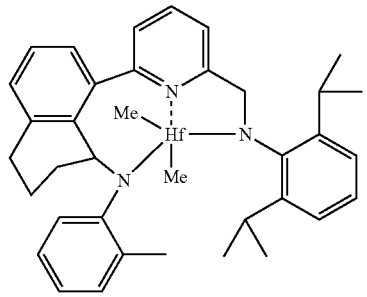

(1)

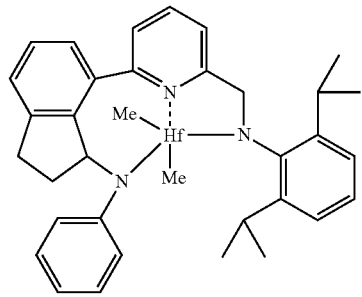

(2)

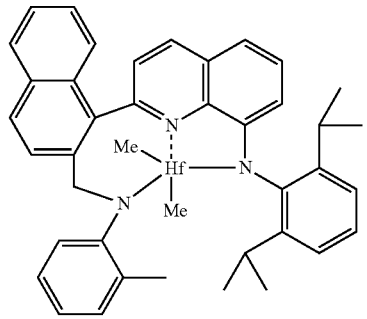

(3)

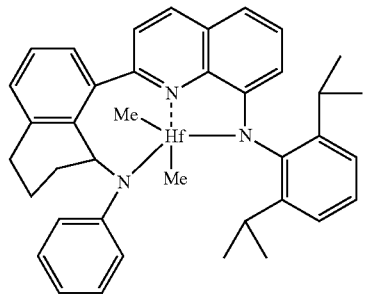

(4)

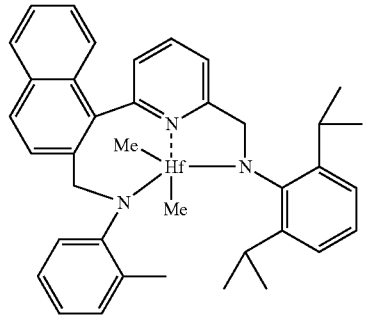

(5)

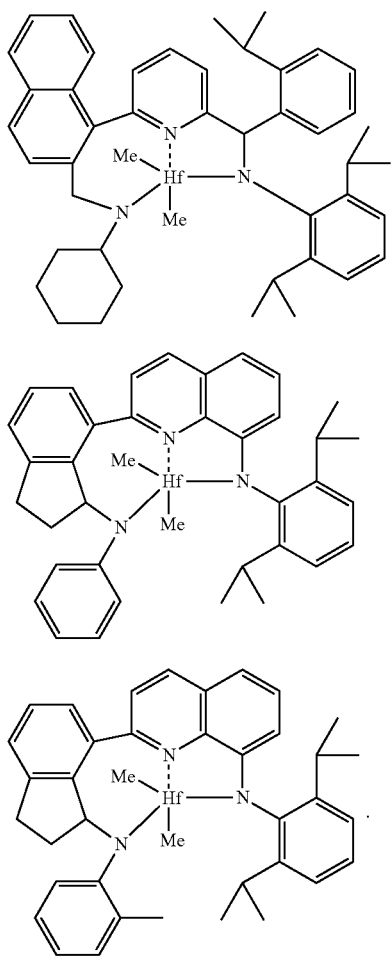

(6)

(7)

(8)

In at least one embodiment, the catalyst system preferably includes the following transition metal pyridyldiamide compound:

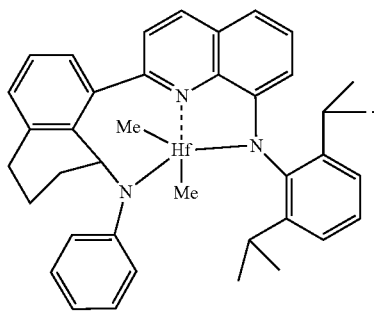

(4)

This invention further relates to a catalyst system comprising: a) a bridged biscyclopentadienyl compounds as described above; b) a transition metal pyridyldiamide compound as described above; (c) a bridged or unbridged metallocene catalyst compound that is different from the bridged biscyclopentadienyl compound of (a); and d) a transition metal pyridyldiamide compound that is different from the transition metal pyridyldiamide compound of (b).

This invention further relates to a catalyst system comprising: a) a bridged biscyclopentadienyl compounds as described above; b) a transition metal pyridyldiamide compound as described above; and c) a transition metal pyridyldiamide compound that is different from the transition metal pyridyldiamide compound of (b).

This invention further relates to a catalyst system comprising: a) a bridged biscyclopentadienyl compounds as described above; b) a transition metal pyridyldiamide compound as described above; and (c) a bridged or unbridged metallocene catalyst compound that is different from the bridged biscyclopentadienyl compound of (a).

For purposes of this invention, one catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl. Thus, as used herein, a single, bridged, asymmetrically substituted metallocene catalyst component having a racemic and/or meso isomer does not, itself, constitute two different bridged, metallocene catalyst components.

In any embodiment of this invention, the catalyst system further includes an activator. In any embodiment of this invention, the catalyst system further includes a support material. In any embodiment of this invention, the catalyst system further includes an activator and a support material.

In embodiments of the invention, the catalyst system further comprises an activator comprising an alumoxane. In embodiments of the invention, the catalyst system further comprises an activator comprising a non-coordinating anion activator. In embodiments of the invention, the catalyst system further comprises a silica support.

Activators

After the catalyst complexes have been synthesized, catalyst systems may be formed by combining the complexes with optional activators in any suitable manner. The catalyst system, or any component thereof, may optionally be supported for use in slurry or gas phase polymerization. The catalyst systems may also be added to or generated in homogeneous polymerization systems, such as solution polymerization or bulk (in the monomer) polymerization. The catalyst system typically includes the two catalyst complexes as described above and an activator such as alumoxane or a non-coordinating anion.

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another useful alumoxane is solid polymethylaluminoxane as described in U.S. Pat. Nos. 9,340,630; 8,404,880; and 8,975,209.

When the activator is an alumoxane (modified or unmodified), some embodiments select the maximum amount of activator typically at up to about a 5000-fold molar excess Al/M over all the catalyst compounds (per metal catalytic site). The minimum activator-to-catalyst-compound is about a 1:1 molar ratio. Alternate preferred ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. Preferably, alumoxane is present at about zero mole %, alternately the alumoxane is present at a molar ratio of aluminum to catalyst compound transition metal less than about 500:1, preferably less than about 300:1, preferably less than about 100:1, preferably less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator.

In a preferred embodiment, boron containing NCA activators represented by the formula below can be used:

where: Z is (L-H) or a reducible Lewis acid; L is a neutral Lewis base; H is hydrogen; (L-H)$^+$ is a Bronsted acid; A$^{d-}$ is a non-coordinating anion, for example a boron containing non-coordinating anion having the charge d–; and d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acids in "Z" include those represented by the formula: (Ph$_3$C), where Ph is a substituted or unsubstituted phenyl, preferably substituted with C$_1$ to C$_{40}$ hydrocarbyls or substituted a C$_1$ to C$_{40}$ hydrocarbyls, preferably C$_1$ to C$_{20}$ alkyls or aromatics or substituted C$_1$ to C$_{20}$ alkyls or aromatics, preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component A$^{d-}$ includes those having the formula [M$^{k+}$Q$_n$]$^{d-}$ wherein k is 1, 2, or 3; n is 1, 2, 3, 4, 5, or 6 (preferably 1, 2, 3, or 4); n–k=d; M is an element selected from Group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

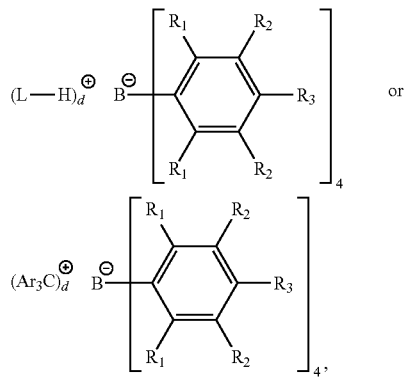

wherein:
each $R_1$ is, independently, a halide, preferably a fluoride;
Ar is a substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R^2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators as described in U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluorophenyl)borate, triphenylcarbenium tetrakis (perfluorophenyl)borate, [Ph$_3$C$^+$][B(C$_6$F$_5$)4$^-$], [Me$_3$NH$^+$][B (C$_6$F$_5$)4$^-$], 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridine.

In a preferred embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate.

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

Most preferably, the ionic activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, triphenylcarbenium tetra (perfluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, or tropillium tetrakis(perfluoronaphthyl)borate.

The typical activator-to-catalyst ratio, e.g., all NCA activators-to-catalyst ratio is about a 1:1 molar ratio. Alternate preferred ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, preferably about 1:1 to about 5:1.

It is also within the scope of the present disclosure that the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Particularly useful chain transfer agents are trialkylaluminums and dialkylzincs, which are represented by the formulas $AlR_3$ and $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Optional Support Materials

In embodiments of the invention herein, the catalyst system may comprise an inert support material. Preferably, the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the support material useful in the present disclosure is in the range of from about 10 to about 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Preferred silicas are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this disclosure. The calcined support material is then contacted with at least one polymerization catalyst system having at least one catalyst compound and an activator.

The support material, having reactive surface groups, typically hydroxyl groups, is slurried in a non-polar solvent and the resulting is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Fluorided Support

In an embodiment, a fluorided (also referred to as fluoridated) support is used for any catalyst system disclosed herein. The fluorided supports (such as fluorided silica) can be obtained through the addition of a solution of polar solvent (such as water) and fluorine compound (such as $(NH_4)_2SiF_6$) to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in U.S. Publication No. 2002/0123582 A1.

In an embodiment, an aqueous solution of fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over about 100° C. for at least about 1 h).

In an embodiment, a solution of polar solvent and fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over about 100° C. for at least about 1 h).

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, $[H(OEt_2)_2]$+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

This invention also relates to a method of polymerizing olefins to produce at least one polyolefin composition. The method includes contacting at least one olefin with any catalyst system of the present disclosure; and obtaining a polyolefin. If an activator(s) is used, the catalyst compounds and activator(s) may be combined in any order, and are combined typically prior to contacting with the monomer (such as propylene).

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the present disclosure, the monomer includes propylene, an optional comonomer comprising one or more ethylene or $C_4$ to $C_{40}$ olefins, preferably $C_4$ to $C_{20}$ olefins, or preferably $C_6$ to $C_{12}$ olefins, and optional diene. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer includes ethylene, a comonomer comprising one or more $C_3$ to $C_{40}$ olefins, preferably $C_4$ to $C_{20}$ olefins, or preferably $C_6$ to $C_{12}$ olefins and a diene. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, norbornene, and their respective homologs and derivatives.

In a preferred embodiment, one or more dienes are present in the polymer produced herein at up to about 10 wt %, preferably at about 0.00001 to about 1.0 wt %, preferably about 0.002 to about 0.5 wt %, even more preferably about 0.003 to about 0.2 wt %, based upon the total weight of the composition. In some embodiments about 500 ppm or less of diene is added to the polymerization, preferably about 400 ppm or less, preferably about 300 ppm or less. In other embodiments at least about 50 ppm of diene is added to the polymerization, or about 100 ppm or more, or about 150 ppm or more.

Preferred diolefin monomers useful in the present disclosure include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions, preferably ethylidene norbornene, dicyclopentadiene, norbornene, vinyl norbornene, norbornadiene, and their respective homologs and derivatives.

Most preferred olefins for the methods of polymerizing olefins described herein comprise ethylene, propylene, butene, pentene, hexene, heptene, octene, nonene, decene, undecene, dodecene, 5-ethylidene-2-norbornene, dicyclopentadiene, vinyl norbornene, or mixtures thereof.

Preferably, the monomers that are contacted with a catalyst system, which may be any catalyst system described herein, are: 1) ethylene, 2) $C_4$ to $C_{20}$ alpha olefin (such as propylene, butene, pentene, hexene, heptene, octene, nonene, decene, undecene, dodecene), and 3) diene. Preferably, the monomers that are contacted with a catalyst system, which may be any catalyst system described herein, are ethylene, propylene and diene, preferably ethylene, propylene and diene selected from the group consisting of 5-ethylidene-2-norbornene, dicyclopentadiene, vinyl norbornene or mixtures thereof.

Polymerization processes of the present disclosure can be carried out in suitable any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (The homogeneous polymerization process is preferably a process where at least about 90 wt % of the product is soluble in the reaction media.) A bulk homogeneous process is particularly preferred. (A preferred bulk process is a process where monomer concentration in all feeds to the reactor is about 70 vol % or more.) Alternately, no solvent or diluent is present or added in the reaction medium, (except for the small amounts used as the carrier for the catalyst system or other additives, or amounts typically found with the monomer; e.g., propane in propylene). According to an embodiment, a method of polymerizing olefins to produce at least one polyolefin composition, the method includes: contacting at least one olefin with a catalyst system of the present disclosure; and obtaining a polyolefin. This method can include introducing the catalyst system into a reactor as a slurry.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than about 1 wt %, preferably less than about 0.5 wt %, preferably less than about 0 wt % based upon the weight of the solvents.

In a preferred embodiment, the feed concentration of the monomers and comonomers for the polymerization is about 60 vol % solvent or less, preferably about 40 vol % or less, or preferably about 20 vol % or less, based on the total volume of the feedstream. Preferably, the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., alternately 100° C. to 300° C., alternately 70 to 150° C., alternately about 20° C. to about 200° C., alternately about 35° C. to about 150° C.; and at a pressure in the range of from about 0.35 MPa to about 200 MPa, preferably from about 0.45 MPa to about 100 MPa, or preferably from about 0.5 MPa to about 50 MPa. In a typical polymerization, the run time of the reaction is up to about 300 minutes, preferably in the range of from about 5 to about 250 minutes, or preferably from about 10 to about 120 minutes. It has been found that higher pressure has higher monomer solubility in solution and higher reactivity.

In some embodiments, the catalyst systems described herein have a molar ratio of the bridged biscyclopentadienyl compound to the transition metal pyridyldiamide compound from about 0.05 to about 10, preferably about 0.1 to about 5, more preferably about 0.25 to about 2.0.

In some embodiments, hydrogen is present in the polymerization reactor at a partial pressure of about 0.001 to about 50 psig (about 0.007 to about 345 kPa), preferably from about 0.01 to about 25 psig (about 0.07 to about 172 kPa), more preferably about 0.1 to about 10 psig (about 0.7 to about 70 kPa).

In an alternate embodiment, the activity of the catalyst is at least about 50 g/mmol/hour, preferably about 500 or more g/mmol/hour, preferably about 5000 or more g/mmol/hr, preferably about 50,000 or more g/mmol/hr. In an alternate embodiment, the conversion of olefin monomer is at least about 10%, based upon polymer yield and the weight of the monomer entering the reaction zone, preferably about 20% or more, preferably about 30% or more, preferably about 50% or more, preferably about 80% or more.

In a preferred embodiment, little or no alumoxane is used in the process to produce the polymers. Preferably, alumoxane is present at about zero mol %, alternately the alumoxane is present at a molar ratio of aluminum to transition metal less than about 500:1, preferably less than about 300:1, preferably less than about 100:1, preferably less than about 1:1.

In a preferred embodiment, little or no scavenger is used in the process to produce the polymer. Preferably, scavenger (such as tri alkyl aluminum or bis(diisobutylaluminum) oxide) is present at about zero mol %, alternately the scavenger is present at a molar ratio of scavenger metal to transition metal of less than about 100:1, preferably less than about 50:1, preferably less than about 15:1, preferably less than about 10:1.

In a preferred embodiment, the polymerization: 1) is conducted at temperatures of about 0 to about 300° C. (preferably about 25 to about 150° C., preferably about 80 to about 150° C., preferably about 100 to about 140° C.); 2) is conducted at a pressure of atmospheric pressure to about 50 MPa; 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than about 1 wt %, preferably less than about 0.5 wt %, preferably at about 0 wt % based upon the weight of the solvents); 4) optionally, wherein the catalyst system used in the polymerization includes less than about 0.5 mol %, preferably about 0 mol % alumoxane, alternately the alumoxane is present at a molar ratio of aluminum to transition metal less than about 500:1, preferably less than about 300:1, preferably less than about 100:1, preferably less than about 1:1; and 5) the polymerization preferably occurs in one reaction zone. Preferably, the polymerization uses a single reactor.

Other additives may also be used in the polymerization, as desired, such as one or more scavengers, promoters, modifiers, hydrogen, chain transfer agents (including zinc and aluminum-based chain transfer agents), reducing agents, oxidizing agents, hydrogen, aluminum alkyls, or silanes.

Chain Transfer Agents

Chain transfer agents useful herein include alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Scavengers

In some embodiments, when using the catalyst systems described herein, particularly when they are immobilized on a support, the catalyst system will additionally comprise one or more scavenging compounds. Useful scavenging compounds are compounds that removes polar impurities from the reaction environment. These impurities adversely affect catalyst activity and stability. Typically, the scavenging compound will be an organometallic compound such as the Group 13 organometallic compounds of U.S. Pat. Nos. 5,153,157; 5,241,025; WO-A-91/09882; WO-A-94/03506; WO-A-93/14132; and that of WO 95/07941. Exemplary compounds include triethyl aluminum, triethyl borane, tri-iso-butyl aluminum, methyl alumoxane, modified methylalumoxanes, bis(diisobutylaluminum)oxide, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-isoprenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes (methylalumoxane), aluminum oxides (e.g., bis(diisobutylaluminum)oxide), and modified alumoxanes (e.g., MMAO-3A) also may be added in scavenging quantities with other activators such as $[Me_2HNPh]^+[B(pfp)_4]^-$ or $B(pfp)_3$ (perfluorophenyl=pfp=$C_6F_5$).

Preferred aluminum scavengers useful in the invention also include those where there is an oxygen present. That is, the material per se or the aluminum mixture used as a scavenger, includes an aluminum/oxygen species, such as an alumoxane or alkylaluminum oxides, e.g., dialkylaluminum oxides, such as bis(diisobutylaluminum) oxide. In one aspect, aluminum containing scavengers can be represented by the formula $((R_z\text{—}Al\text{—})_y O\text{—})_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Solution Polymerization

In particularly useful embodiments, the catalysts systems described herein may be used to polymerize monomers and comonomers in solution processes. A solution polymerization is preferably a polymerization process in which the polymer is dissolved in a liquid polymerization medium, such as an inert solvent or monomer(s) or their blends. A solution polymerization is typically homogeneous. A homogeneous polymerization is typically one where the polymer product is dissolved in the polymerization medium. Such systems are preferably not turbid as described in J. Vladimir Oliveira, C. Dariva and J. C. Pinto, Ind. Eng, Chem. Res., 29, 2000, 4627. Generally solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 10° C. to about 150° C. and at pressures of about 0.1 MPa or more, preferably about 2 MPa or more. The upper pressure limit is typically about 200 MPa or less, preferably, about 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Polyolefin Products

This disclosure also relates to compositions of matter produced by the methods described herein. In a preferred embodiment, the catalyst systems and methods herein produce ethylene, alpha-olefin, diene monomer copolymers, preferably ethylene, propylene, diene monomer copolymers, i.e., EPDM.

Preferably, an ethylene, alpha-olefin, diene copolymer is obtained by contacting ethylene, at least one alpha olefin (preferably propylene), and at least one diene with any catalyst system of the present disclosure.

The copolymers produced herein may have bimodal molecular weight, i.e., having a low molecular weight component and a high molecular weight component.

The high molecular weight components of the copolymers produced herein have a peak molecular weight of 2,000,000 g/mol to about 10,000,000 g/mol, preferably from about 2,5000,000 g/mol to about 9,000,000 g/mol, and most preferably from about 3,000,000 g/mol to about 8,000,000 g/mol. The high molecular weight components of the copolymers produced herein may also have a spread (half-peak width) from about 2 to about 20. The high molecular weight components of the copolymers produced herein can have an ethylene content (in wt %) of more than 40 to about 80 wt %, preferably about 45 to about 75 wt %, most preferably about 50 to about 70 wt %. The high molecular weight components of polymers produced herein preferably have a diene (preferably ethylidene norbornene) content of greater than zero to about 12 wt %, preferably about 1 to about 7 wt %.

In a preferred embodiment, the high molecular weight components of the copolymers produced herein have:

i) a peak molecular weight of 2,000,000 g/mol to about 10,000,000 g/mol, preferably from about 2,500,000 g/mol to about 9,000,000 g/mol, and most preferably from about 3,000,000 g/mol to about 8,000,000 g/mol;

ii) an ethylene content (in wt %) of more than 40 to about 80 wt %, preferably about 45 to about 75 wt %, most preferably about 50 to about 70 wt %;

iii) a $C_3$ to $C_{40}$ alpha olefin (preferably propylene) content (in wt %) of more than 20 to about 60 wt %, preferably about 25 to about 55 wt %, most preferably about 30 to about 50 wt %; and iv) a diene (preferably ethylidene norbornene) content of greater than zero to about 12 wt %, preferably about 1 to about 7 wt %.

The low molecular weight components of the copolymers produced herein have a peak molecular weight of about 100,000 to less than 2,000,000 g/mol, preferably about 100,000 to less than 1,000,000 g/mol, preferably about 100,000 to about 800,000 g/mol, preferably about 100,000 to about 600,000 g/mol, preferably from about 150,000 to about 550,000 g/mol, most preferably from about 200,000 to about 500,000 g/mol. The low molecular weight components of the copolymers produced herein may have a spread (half peak width) of about 2 to about 20. The low molecular weight components of the copolymers produced herein can have an ethylene content (in wt %) of about 10 to about 50 wt %, preferably about 20 to about 45 wt %, most preferably about 25 to about 40 wt %. The low molecular weight components of polymers produced herein have a diene (preferably ethylidene norbornene) content of greater than zero to about 12 wt %, preferably about 1 to about 7 wt %.

In a preferred embodiment, the low molecular weight components of the copolymers produced herein have:

i) peak molecular weight of about 100,000 to less than 2,000,000 g/mol, preferably about 100,000 to about 1,000,000 g/mol, preferably about 100,000 to about 800,000 g/mol, preferably about 100,000 to about 600,000 g/mol, preferably from about 150,000 to about 550,000 g/mol, most preferably from about 200,000 to about 500,000 g/mol;

ii) an ethylene content (in wt %) of about 10 to about 50 wt %, preferably about 20 to about 45 wt %, most preferably about 25 to about 40 wt %;

iii) a $C_3$ to $C_{40}$ alpha olefin (preferably propylene) content (in wt %) of more than 50 to about 90 wt %, preferably about 55 to about 80 wt %, most preferably about 60 to about 75 wt %; and iv) a diene (preferably ethylidene norbornene) content of greater than zero to about 12 wt %, preferably about 1 to about 7 wt %.

Preferably, the low MW components are a majority (50 wt % or more) of the components of the polymer produced, preferably greater than about 55 wt % more preferably greater than about 70 wt % of the polymer produced, even more preferably greater than about 80 wt % of the polymer produced.

Preferably, the high MW component of the polymer produced is less than 50 wt % of the polymer, more preferably less than about 35 wt %, even more preferably less than about 20 wt %.

Preferably, the polymers produced herein have:

i) low MW component present at 50 to 99.9 wt %, preferably 55 to 95 wt % more preferably 75 to 95 wt %, even more preferably 75 to 90 wt %; and ii) high MW component present at 0.1 to 50 wt %, 5 to 45 wt %, even more preferably from 5 to 25 wt %, even more preferably about 10 to 25 wt % based upon the weight of the copolymer.

Preferably, the low MW components are a majority of the components of the EPDM produced herein, more preferably greater than about 70% of the EPDM, even more preferably greater than about 80% of the EPDM. Preferably, the low MW components have MWs less than about 500,000 g/mol. Preferably, the low MW components of the bimodal EPDM have greater than about 50 wt % propylene ($C_3$ content), more preferably greater than about 60 wt % propylene, based upon the weight of the EPDM. Accordingly, it is preferred that the ethylene content ($C_2$ wt %) in the low MW component be less than about 50 wt %, more preferably less than about 40 wt %, based upon the weight of the EPDM.

Preferably, the high MW component of the EPDM is less than about 50 wt % of the EPDM, more preferably less than about 35 wt %, even more preferably less than about 20 wt %, based upon the weight of the EPDM. Preferably, the high MW components have a peak molecular weights greater than about 2,000,000 g/mol. Preferably, the high MW components of the bimodal EPDM have less than about 60 wt % propylene ($C_3$ content), more preferably less than about 50 wt % propylene, based upon the weight of the EPDM. Accordingly, it is preferred that the ethylene content ($C_2$ wt %) in the high MW component be more than about 40 wt %, more preferably greater than about 50 wt %, based upon the weight of the EPDM.

In an embodiment, an ethylene, alpha-olefin, diene copolymer is provided. Preferably, the copolymer includes a high molecular weight component and a low molecular component. Even more preferably, the copolymer is less than about 20 wt % of the high molecular weight component. In another preferred embodiment, an ethylene, alpha-olefin, diene copolymer includes greater than about 40 wt % ethylene, and the low molecular weight component includes less than about 40 wt % ethylene.

Copolymers produced herein (preferably ethylene, alpha-olefin, diene copolymers) preferably have a g'vis value of about 0.95 or greater, preferably about 0.97 or greater, more preferably about 0.98 or greater.

Ethylene, propylene, diene (preferably ethylidene norbornene) copolymer produced herein preferably has a g'vis value of about 0.95 or greater, preferably about 0.97 or greater, more preferably about 0.98 or greater.

In a preferred embodiment, a polymer has a multimodal molecular weight distribution as determined by Gel Permeation Chromatography. By "multimodal" is meant that the GPC trace has at least two peaks. For GPC traces where the peaks include "shoulders," the term bimodal means that the GPC trace has at least two inflection points, e.g., one for the peak, and one the shoulder. (FIG. 3 is an example of a GPC trace having a peak and shoulder). An inflection point is that point where the second derivative of the curve changes in sign (e.g., from negative to positive or vice versus).

Molecular weight and measurement methods are described in the Experimental Section.

In some embodiments herein, a multimodal polyolefin composition is produced, having a first polyolefin component and at least another polyolefin component, different from the first polyolefin component by molecular weight, preferably such that the GPC trace has more than one peak or inflection point.

Unless otherwise indicated, measurements of the moments of molecular weight, i.e., peak molecular weight, weight average molecular weight (Mw), number average molecular weight (Mn), and z average molecular weight (Mz) are determined by Gel Permeation Chromatography (GPC) as described in the Experimental section below. In at least some embodiments, the polymer produced is a tactic polymer, preferably an isotactic polymer. The copolymers produced herein may have at least about 20% (preferably at least about 30%, preferably at least about 40%) isotactic pentads. A polymer is "isotactic" if it has 10% or more isotactic pentads (alternately 20% or more, alternately 30% or more, preferably 40% or more isotactic pentads). A polyolefin is "atactic," also referred to as "amorphous" if it has less than about 10% isotactic pentads and syndiotactic pentads. Preferably, the copolymers produced herein have less than 10% isotactic pentads.

Polypropylene microstructure is determined by $^{13}$C-NMR spectroscopy, including the concentration of isotactic and syndiotactic diads ([m] and [r]), triads ([mm] and [n]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C-NMR METHOD (Academic Press, New York, 1977).

In a preferred embodiment, the copolymer produced herein has 50 to 99.9 wt %, of a low molecular weight component and 0.1 to 50 wt % of a high molecular weight component (based upon the weight of the copolymer); wherein a) the high molecular weight component has:
  i) a peak molecular weight of 2,000,000 g/mol to 10,000,000 g/mol;
  ii) optionally, a spread (half-peak width) from 2 to 20;
  iii) an ethylene content (in wt %) of more than 40 to 80 wt %,
  iv) a $C_3$ to $C_{40}$ alpha olefin (preferably propylene) content of 20 to 60 wt %;
  v) a diene content of 0.1 to 12 wt %, based upon the weight of the copolymer; and b) the low molecular weight component has:
  i) a peak molecular weight of 100,000 to less than 2,000,000 g/mol
  ii) optionally, a spread (half peak width) of 2 to 20
  iii) an ethylene content of about 10 to about 50 wt %
  iv) a $C_3$ to $C_{40}$ alpha olefin (preferably propylene) content of 50 to 90 wt %;
  v) a diene content of 0.1 to 12 wt %, based upon the weight of the copolymer; and wherein the copolymer has:
  1) a g'vis value of about 0.95 or greater;
  2) an Mw of 500,000 g/mol or more (alternately 750,000 g/mol or more);
  3) an Mn of 75,000 g/mol or more (alternately 100,000 g/mol or more);
  4) an Mw/Mn of from 3 to 15, preferably 4 to 10, preferably 5 to 9; and 5) an ethylene content of 55 wt % or less, alternately 10 to 45 wt %.

Blends

In another embodiment, the polymer produced herein (preferably, an EPDM) is combined with one or more additional polymers prior to being formed into a film, molded part or other article. Additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the copolymer produced herein (preferably EPDM) is present in the above blends, at from about 10 to about 99 wt %, based upon the weight of the polymers in the blend, preferably about 20 to about 95 wt %, even more preferably at least about 30 to about 90 wt %, even more preferably at least about 40 to about 90 wt %, even more preferably at least about 50 to about 90 wt %, even more preferably at least about 60 to about 90 wt %, even more preferably at least about 70 to about 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In a preferred embodiment, the polymers produced herein are blended with polypropylene (such as isotactic polypropylene), preferably to prepare thermoplastic olefins (TPO's). Typically, the blend (such as a TPO) comprises from 20 to 95 wt % based on the total polymer content of polypropylene (typically having a having a melting point of 110° C. or more, from 80 to 5 wt % (based on the total polymer content), of the copolymer produced herein, such as an EPDM copolymer, optional filler and/or other additives.

It should be appreciated that the list of applications above is merely exemplary, and is not intended to be limiting.

EXPERIMENTAL

Examples

Catalyst A, bis(p-triethylsilylphenyl)carbyl(cyclopentadienyl) (2,7-di-t-butylfluorenyl)hafnium dimethyl may be prepared as described in U.S. Pat. No. 6,528,670 B1. For the experiments herein, catalyst was purchased from commercial sources and used as received.

Catalyst B, 2-(8-anilino-5,6,7,8-tetrahydronaphthalen-1-yl)-N-(2,6-diisopropylphenyl) quinolin-8-amido hafnium dimethyl, was prepared as described below.

8-(2,6-Diisopropylphenylamino)quinolin-2(1H)-one

To a suspension of NaH (5.63 g of 60 wt % in mineral oil, 140 mmol) in tetrahydrofuran (1000 mL) was added 8-bromoquinolin-2(1H)-one (30.0 g, 134 mmol) in small portions at 0° C. The obtained reaction mixture was warmed to room temperature, stirred for 30 min, and then cooled to 0° C. Then t-butyldimethylsilylchloride (20.2 g, 134 mmol) was added in one portion. This mixture was stirred for 30 min at room temperature and then poured into water (1 L). The protected 8-bromoquinolin-2(1H)-one was extracted with diethyl ether (3×400 mL). The combined extracts were dried over $Na_2SO_4$ and then evaporated to dryness. Yield 45.2 g (quant., 99% purity by GC/MS) of a dark red oil. To a solution of 2,6-diisopropylaniline (27.7 mL, 147 mmol) and toluene (1.5 L) was added n-butyllithium (60.5 mL, 147 mmol, 2.5 M in hexanes) at room temperature. The obtained suspension was heated briefly to 100° C. and then cooled to room temperature. To the reaction mixture was added $Pd_2$(dba)$_3$ (dba=dibenzylideneacetone) (2.45 g, 2.68 mmol) and XPhos (XPhos=2-Dicyclohexylphosphino-2',4',6'-triisopropylbiphenyl) (2.55 g, 5.36 mmol) followed by the addition of the protected 8-bromoquinolin-2(1H)-one (45.2 g, 134 mmol). The obtained dark brown suspension was heated at 60° C. until lithium salt precipitate disappeared (ca. 30 min). The resulting dark red solution was quenched by addition of water (100 mL), and the organic layer was separated, dried over $Na_2SO_4$ and then evaporated to dryness. The obtained oil was dissolved in a mixture of dichloromethane (1000 mL) and methanol (500 mL), followed by an addition of 12 M HCl (50 mL). The reaction mixture was stirred at room temperature for 3 h, then poured into 5% $K_2CO_3$ (2 L). The product was extracted with dichloromethane (3×700 mL). The combined extracts were dried over $Na_2SO_4$, filtered, and then evaporated to dryness. The resulting solid was triturated with n-hexane (300 mL), and the obtained suspension collected on a glass frit. The precipitate was dried in vacuum. Yield 29.0 g (67%) of a marsh-green solid. Anal. calc. for $C_{21}H_{24}N_2O$: C, 78.71; H, 7.55; N, 8.74. Found: C, 79.00; H, 7.78; N, 8.50. $^1$H NMR (CDCl$_3$): δ 13.29 (br.s, 1H), 7.80-7.81 (d, 1H, J=9.5 Hz), 7.35-7.38 (m, 1H), 7.29-7.30 (m, 3H), 6.91-6.95 (m, 2H), 6.58-6.60 (d, 1H, J=9.5 Hz), 6.27-6.29 (m, 1H), 3.21 (sept, 2H, J=6.9 Hz), 1.25-1.26 (d, 6H, J=6.9 Hz), 1.11-1.12 (d, 6H, J=6.9 Hz).

2-Chloro-N-(2,6-diisopropylphenyl)quinolin-8-amine 29.0 g (90.6 mmol) of 8-(2,6-diisopropylphenylamino) quinolin-2(1H)-one was added to 400 mL of POCl$_3$ in one portion. The resulting suspension was heated for 40 h at 105° C., then cooled to room temperature, and poured into 4000 cm³ of a crushed ice. The crude product was extracted with 3×400 mL of diethyl ether. The combined extract was dried over $K_2CO_3$ and then evaporated to dryness. The resulting solid was triturated with 30 mL of cold n-hexane, and the formed suspension was collected on a glass frit. The obtained solid was dried in vacuum. Yield 29.0 g (95%) of a yellow-green solid. Anal. calc. for $C_{21}H_{23}N_2Cl$: C, 74.43; H, 6.84; N, 8.27. Found: C, 74.68; H, 7.02; N, 7.99. $^1H$ NMR ($CDCl_3$): δ 8.04-8.05 (d, 1H, J=8.6 Hz), 7.38-7.39 (d, 1H, J=8.5 Hz), 7.33-7.36 (m, 1H), 7.22-7.27 (m, 4H), 7.04-7.06 (d, 1H, J=8.1 Hz), 6.27-6.29 (d, 1H, J=7.8 Hz), 3.20 (sept, 2H, J=6.9 Hz), 1.19-1.20 (d, 6H, J=6.9 Hz), 1.10-1.11 (d, 6H, J=6.9 Hz).

8-Bromo-1,2,3,4-tetrahydronaphthalen-1-ol

To a mixture of 78.5 g (530 mmol) of 1,2,3,4-tetrahydronaphthalen-1-ol, 160 mL (1.06 mol) of N,N,N',N'-tetramethylethylenediamine, and 3000 mL of pentane cooled to −20° C. 435 mL (1.09 mol) of 2.5 M ″BuLi in hexanes was added dropwise. The obtained mixture was refluxed for 12 h, then cooled to −80° C., and 160 mL (1.33 mol) of 1,2-dibromotetrafluoroethane was added. The obtained mixture was allowed to warm to room temperature and then stirred for 12 h at this temperature. After that, 100 mL of water was added. The resulting mixture was diluted with 2000 mL of water, and the organic layer was separated. The aqueous layer was extracted with 3×400 mL of toluene. The combined organic extract was dried over $Na_2SO_4$ and then evaporated to dryness. The residue was distilled using the Kugelrohr apparatus, b.p. 150-160° C./1 mbar. The obtained yellow oil was dissolved in 100 mL of triethylamine, and the formed solution was added dropwise to a stirred solution of 71.0 mL (750 mmol) of acetic anhydride and 3.00 g (25.0 mmol) of 4-dimethylaminopyridine in 105 mL of triethylamine. The formed mixture was stirred for 5 min, then 1000 mL of water was added, and the obtained mixture was stirred for 12 h. After that, the reaction mixture was extracted with 3×200 mL of ethyl acetate. The combined organic extract was washed with aqueous $Na_2CO_3$, dried over $Na_2SO_4$, and then evaporated to dryness. The residue was purified by flash chromatography on silica gel 60 (40-63 um, eluent: hexaneethyl acetate=30:1, vol.). The isolated ester was dissolved in 1500 mL of methanol, 81.0 g (1.45 mol) of KOH was added, and the obtained mixture was heated to reflux for 3 h. The reaction mixture was then cooled to room temperature and poured into 4000 mL of water. The title product was extracted with 3×300 mL of dichloromethane. The combined organic extract was dried over $Na_2SO_4$ and then evaporated to dryness. Yield 56.0 g (47%) of a white crystalline solid. $^1H$ NMR ($CDCl_3$): δ 7.38-7.41 (m, 1H, 7-H); 7.03-7.10 (m, 2H, 5,6-H); 5.00 (m, 1H, 1-H), 2.81-2.87 (m, 1H, 4/4'-H), 2.70-2.74 (m, 1H, 4'/4-H), 2.56 (br.s., 1H, OH), 2.17-2.21 (m, 2H, 2,2'-H), 1.74-1.79 (m, 2H, 3,3'-H).

8-Bromo-3,4-dihydronaphthalen-1(2H)-one

To a solution of 56.0 g (250 mmol) of 8-bromo-1,2,3,4-tetrahydronaphthalen-1-ol in 3500 mL of dichloromethane was added 265 g (1.23 mol) of pyridinium chlorochromate (PCC). The resulting mixture was stirred for 5 h at room temperature, then passed through a pad of silica gel 60 (500 mL; 40-63 um), and finally evaporated to dryness. Yield 47.6 g (88%) of a colorless solid. $^1H$ NMR ($CDCl_3$): δ 7.53 (m, 1H, 7-H); 7.18-7.22 (m, 2H, 5,6-H); 2.95 (t, J=6.1 Hz, 2H, 4,4'-H); 2.67 (t, J=6.6 Hz, 2H, 2,2'-H); 2.08 (quint, J=6.1 Hz, J=6.6 Hz, 2H, 3,3'-H).

(8-Bromo-1,2,3,4-tetrahydronaphthalen-1-yl)phenylamine

To a stirred solution of 21.6 g (232 mmol) of aniline in 140 mL of toluene was added 10.93 g (57.6 mmol) of $TiCl_4$ over 30 min at room temperature under argon atmosphere. The resulting mixture was stirred for 30 min at 90° C. followed by an addition of 13.1 g (57.6 mmol) of 8-bromo-3,4-dihydronaphthalen-1(2H)-one. This mixture was stirred for 10 min at 90° C., then cooled to room temperature, and poured into 500 mL of water. The product was extracted with 3×50 mL of ethyl acetate. The combined organic extract was dried over $Na_2SO_4$, evaporated to dryness, and the residue was re-crystallized from 10 mL of ethyl acetate. The obtained crystalline solid was dissolved in 200 mL of methanol, 7.43 g (118 mmol) of $NaBH_3CN$ and 3 mL of acetic acid were added in argon atmosphere. This mixture was heated to reflux for 3 h, then cooled to room temperature, and evaporated to dryness. The residue was diluted with 200 mL of water, and crude product was extracted with 3×100 mL of ethyl acetate. The combined organic extract was dried over $Na_2SO_4$ and evaporated to dryness. The residue was purified by flash chromatography on silica gel 60 (40-63 um, eluent: hexane-ethyl acetate-triethylamine=100:10:1, vol.). Yield 13.0 g (75%) of a yellow oil. Anal. Calc. for $C_{16}H_{16}BrN$: C, 63.59; H, 5.34; N, 4.63. Found: C, 63.82; H, 5.59; N, 4.49. $^1H$ NMR ($CDCl_3$): δ 7.44 (m, 1H), 7.21 (m, 2H), 7.05-7.11 (m, 2H), 6.68-6.73 (m, 3H), 4.74 (m, 1H), 3.68 (br.s, 1H, NH), 2.84-2.89 (m, 1H), 2.70-2.79 (m, 1H), 2.28-2.32 (m, 1H), 1.85-1.96 (m, 1H), 1.76-1.80 (m, 1H), 1.58-1.66 (m, 1H).

N-Phenyl-8-(4,4,5,5-tetramethyl-1,3,2-dioxaborolan-2-yl)-1,2,3,4-tetrahydronaphthalen-1-amine To a solution of 13.0 g (43.2 mmol) of (8-bromo-1,2,3,4-tetrahydronaphthalen-1-yl)phenylamine in 250 mL tetrahydrofuran (THF) was added 17.2 mL (43.0 mmol) of 2.5 M ″BuLi at −80° C. Further on, this mixture was stirred for 1 h at this temperature, and 56.0 mL (90.3 mmol) of 1.6 M $^tBuLi$ in pentane was added. The resulting mixture was stirred for 1 h at the same temperature. Then, 16.7 g (90.0 mmol) of 2-isopropoxy-4,4,5,5-tetramethyl-1,3,2-dioxaborolane was added. After that the cooling bath was removed, and the resulting mixture was stirred for 1 h at room temperature. Finally, 10 mL of water was added, and the obtained mixture was evaporated to dryness. The residue was diluted with 200 mL of water, and crude product was extracted with 3×100 mL of ethyl acetate. The combined organic extract was dried over $Na_2SO_4$ and then evaporated to dryness. Yield 15.0 g (98%) of a yellow oil. Anal. Calc. for $C_{22}H_{28}BNO_2$: C, 75.65; H, 8.08; N, 4.01. Found: C, 75.99; H, 8.32; N, 3.79. $^1H$ NMR ($CDCl_3$): δ 7.59 (m, 1H), 7.18-7.23 (m, 4H), 6.71-6.74 (m, 3H), 5.25 (m, 1H), 3.87 (br.s, 1H, NH), 2.76-2.90 (m, 2H), 2.12-2.16 (m, 1H), 1.75-1.92 (m, 3H), 1.16 (s, 6H), 1.10 (s, 6H).

2-(8-Anilino-5,6,7,8-tetrahydronaphthalen-1-yl)-N-(2,6-diisopropylphenyl)quinolin-8-amine To a solution of 13.8 g (41.0 mmol) of 2-chloro-N-(2,6-diisopropylphenyl)quinolin-8-amine in 700 mL of 1,4-dioxane were added 15.0 g (43.0 mmol) of N-phenyl-8-(4,4, 5,5-tetramethyl-1,3,2-dioxaborolan-2-yl)-1,2,3,4-tetrahydronaphthalen-1-amine, 35.0 g (107 mmol) of cesium carbonate and 400 mL of water. The obtained mixture was purged with argon for 10 min followed by an addition of 2.48 g (2.15 mmol) of Pd(PPh$_3$)$_4$. The formed mixture was stirred for 2 h at 90° C., then cooled to room temperature. To the obtained two-phase mixture 700 mL of n-hexane was added. The organic layer was separated, washed with brine, dried over Na$_2$SO$_4$, and then evaporated to dryness. The residue was purified by flash chromatography on silica gel 60 (40-63 urn, eluent: hexane-ethyl acetate-triethylamine=100:5:1, vol.) and then re-crystallized from 150 mL of n-hexane. Yield 15.1 g (70%) of a yellow powder. Anal. calc. for C$_{37}$H$_{39}$N$_3$: C, 84.53; H, 7.48; N, 7.99. Found: C, 84.60; H, 7.56; N, 7.84. $^1$H NMR (CDCl$_3$): δ 7.85-7.87 (d, J=7.98 Hz, 1H), 7.56 (br.s, 1H), 7.43-7.45 (d, J=8.43 Hz, 1H), 7.21-7.38 (m, 6H), 7.12 (t, J=7.77 Hz, 1H), 6.87-6.89 (d, J=7.99 Hz, 1H), 6.74 (t, J=7.99 Hz, 1H), 6.36 (t, J=7.32 Hz, 1H), 6.14-6.21 (m, 3H), 5.35 (br.s, 1H), 3.56 (br.s, 1H), 3.20-3.41 (m, 2H), 2.83-2.99 (m, 2H), 2.10-2.13 (m, 1H), 1.77-1.92 (m, 3H), 1.13-1.32 (m, 12H).

Catalyst B (2-(8-anilino-5,6,7,8-tetrahydronaphthalen-1-yl)-N-(2,6-diisopropylphenyl) quinolin-8-amido hafnium dimethyl). Benzene (50 mL) was added to 2-(8-Anilino-5,6,7,8-tetrahydronaphthalen-1-yl)-N-(2,6-diisopropylphenyl)quinolin-8-amine (2.21 g, 4.20 mmol) and Hf(NMe$_2$)$_4$ (1.58 g, 4.45 mmol) to form a clear orange solution. The mixture was heated to reflux for 16 hours to form a clear red-orange solution. Most of the volatiles were removed by evaporation under a stream of nitrogen to afford a concentrated red solution (ca. 5 mL) that was warmed to 40° C. Then hexane (30 mL) was added and the mixture was stirred to cause orange crystalline solid to form. This slurry was cooled to −40° C. for 30 minutes then the solid was collected by filtration and washed with additional cold hexane (2×10 mL). The resulting quinolinyldiamide hafnium diamide was isolated as an orange solid and dried under reduced pressure (2.90 g, 3.67 mmol, 87.4% yield). This solid was dissolved in toluene (25 mL) and Me$_3$Al (12.8 mL, 25.6 mmol) was added. The mixture was warmed to 40° C. for 1 hour then evaporated under a stream of nitrogen. The crude product (2.54 g) was ~90% pure by $^1$H NMR spectroscopy. The solid was purified by recrystallization from CH$_2$Cl$_2$-hexanes (20 mL-20 mL) by slow evaporation to give pure product as orange crystals (1.33 g, 43.2% from ligand). The mother liquor was further concentrated for a second crop (0.291 g, 9.5% from ligand).

GPC-4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content (C$_2$, C$_3$, C$_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (1), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M g/mole. The MW at each elution volume is calculated with following equation $$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha^{PS}=0.67$ and $K_{PS}=0.000175$ while α and K are for other materials as calculated as published in literature (Sun, T. et al. *Macromolecules*, 2001, 34, 6812), except that for purposes of the present disclosure, α=0.700 and K=0.0003931 for ethylene, propylene, diene monomer copolymers (Now Bene: Example 1 below used K=0.000351 and α=0.701), α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards. In particular, this provides the methyls per 1000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which $f$ is 0.3, 0.4, 0.6, 0.8, and so on for C$_3$, C$_4$, C$_6$, C$_8$, and so on comonomers, respectively.

$$w2 = f*SCB/1000TC$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the $CH_3/1000TC$ as a function of molecular weight, is applied to obtain the bulk $CH_3/1000TC$. A bulk methyl chain ends per 1000TC (bulk $CH_3$ end/1000TC) is obtained by weight-averaging the chain-end correction over the molecular-weight range. Then $$w2b = f * \text{bulk } CH3/1000TC$$

$$\text{bulk } SCB/1000TC = \text{bulk } CH3/1000TC - \text{bulk} \frac{CH3\text{end}}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.).

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $$M = K_{PS} M^{\alpha_{PS}+1}/[\eta],$$

where $\alpha_{ps}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymer, which are, for purposes of the present disclosure, $\alpha$=0.700 and K=0.0003931 for ethylene, propylene, diene monomer copolymers, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+ 0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

All molecular weights are weight average unless otherwise noted. All molecular weights are reported in g/mol unless otherwise noted.

Methyl groups per 1000 carbons ($CH_3$/1000 Carbons) is determined by $^1$H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Olefin Polymerizations

The following describes the general polymerization procedure used for the present disclosure. The desired temperatures, pressures, quantities of chemicals used (e.g., pre-catalysts, activators, scavengers, etc.) will vary from experiment to experiment, and specific values are given in Table 1 (or immediately above or below the Table) where data are presented.

Polymerization reactions were carried out in a stirred 2-liter autoclave reactor equipped to perform coordinative insertion polymerization in the presence of an inert hydrocarbon (isohexane) solvent at temperatures up to about 150° C. Prior to polymerization, the reactor was washed with toluene followed by drying with a nitrogen purge at about 150° C. for about 1 h. The reactor was loaded with liquid propylene, ethylidene norbornene (ENB), scavenger (typically about 0.2 M bis(diisobutylaluminum) in hexane), and isohexane solvent (about 1000 mL). The mixture was stirred (about 800 rpm) and heated to the desired temperature for a minimum of about 10 minutes. The reactor pressure at this temperature was noted and then the ethylene regulator is set to the desired pressure above this value. Ethylene gas was introduced and the reactor is allowed to equilibrate while stirring. To start the polymerization a premixed toluene solution (typically about 0.5 mM) of the transition-metal catalyst and activator was then pushed into the reactor with an isohexane chaser (about 200 mL). The polymerization was continued in a semi-continuous fashion, with the ethylene feed maintained during the polymerization. After about 15 minutes the polymerization was quenched by the addition of ethanol (about 5 mL). The reactor was then cooled and vented. A toluene solution of octadecyl 3-(3,5-di-tert-butyl-4-hydroxyphenyl)propionate (Irganox™ 1076) (about 0.1 g, about 5 mL) was added to the solution. The polymer solution was poured into a tray and the volatiles were evaporated. The polymer was further dried in a vacuum oven at about 60° C. overnight.

Average wt % of ethylene ($C_2$ content) and ENB content was determined by $^1H$ NMR and $^{13}C$ NMR.

To determine various molecular weight related values by GPC, high temperature size exclusion chromatography was performed using GPC-IR (Polymer Char). The IV (intrinsic viscosity) molecular weights presented in the examples are relative to linear polystyrene standards whereas the LS (light scattering) and TR (infrared) molecular weights are absolute.

Characterization of selected bimodal E-P-ENB copolymers are shown in Table 2. GPC-IR plots for Examples 1-3 are shown in FIGS. 1-3. In general, the catalyst systems described herein have a molar ratio of the bridged biscyclopentadienyl compound to the transition metal pyridyldiamide compound from about 0.25 to about 2.

Reactor conditions for the polymerization are shown in Table 1, and are described herein. Catalyst A used to prepare moderate MW E-P-ENB with majority propylene is a Cs symmetric bridged metallocene of bis(p-triethylsilylphenyl)carbyl(cyclopentadienyl)(2,7-di-t-butylfluorenyl)hafnium dimethyl:

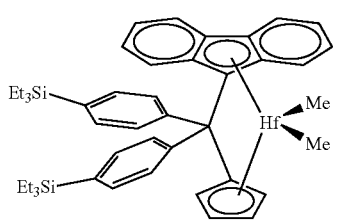

(A)

activated by N, N-dimethyl-anilinium-tetrakis-(pentafluorophenyl) borate.

Catalyst B, selected to synthesize ultrahigh MW E-P-ENB, is a non-metallocene pyridyldiamide catalyst of 2-(8-anilino-5,6,7,8-tetrahydronaphthalen-1-yl)-N-(2,6-diisopropylphenyl)quinolin-8-amido hafnium dimethyl:

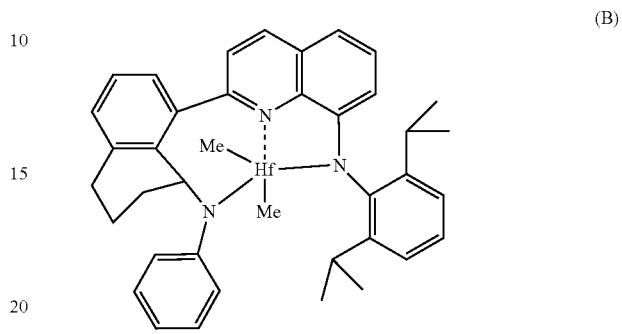

(B)

activated by N, N-dimethyl-anilinium-tetrakis(pentafluorophenyl) borate.

TABLE 1

Reactor Conditions Used to Prepare Examples 1-3

|  | Example 1 | Example 2 | Example 3 |
|---|---|---|---|
| Catalyst A (nmol) | 1500 | 2500 | 2000 |
| Catalyst B (nmol) | 3000 | 2500 | 2000 |
| Catalyst ratio (1:2) | 0.5 | 1 | 1 |
| Ethylene (psi) | 100 | 100 | 100 |
| Propylene (ml) | 100 | 120 | 120 |
| ENB (ml) | 3 | 7 | 7 |
| Reactor Temp. (° C.) | 70 | 70 | 70 |
| Reaction Exotherm (° C.) | 21 | 26 | 29 |
| Activity (g/g) | 22,000 | 18,200 | 30,000 |

TABLE 2

Compositions of Polymers Produced from Examples 1-3

|  | Example 1 | Example 2 | Example 3 |
|---|---|---|---|
| Mn | 249,276 | 118,468 | 147,736 |
| Mw | 1,455,332 | 966,164 | 944,352 |
| Mw/Mn | 5.84 | 8.16 | 6.39 |
| C2 content (wt %) | 36 | 41 | 36 |
| ENB content (wt %) | 1 | 2.9 | 2.2 |
| -Low MW- | | | |
| Amount* (wt %) | 78.9 | 87.8 | 88.7 |
| Peak MW | 472,000 | 219,000 | 319,000 |
| C2 content (wt %) | 28 | 32 | 30 |
| -High MW- | | | |
| Amount* (wt %) | 21.1 | 12.2 | 11.3 |
| Peak MW | 5,210,000 | 3,630,000 | 4,190,000 |
| C2 content (wt %) | 51 | 62 | 60 |

*using 2,000,000 MW as dividing point between low and high MW

The data in Table 2 show molecular weights and compositions of EPDM polymers using the dual organometallic catalysts. The dual catalysts provide for bimodal EPDM polymers, where the low MW component is greater than about 80 wt % by weight and the low MW component has MW less than about 500,000 g/mol, and where the high MW component is less than about 20% by weight and the high MW component is greater than about 500,000 g/mol. Moreover, the ethylene content ($C_2$ wt %) in the EPDM polymers has greater than about 40 wt % ethylene in the high MW components.

The results show EPDM polymers with sufficient elastic properties, toughness, and processability. In order to have sufficient processability, the low MW components need to have MW less than about 500,000 and should be the majority component, preferably to be greater than about 80% by weight. For these bimodal EPDMs to have excellent elasticity, it is preferred that the high MW components have MW greater than about 500,000 g/mol with better properties. In contrast to conventional low activity Ziegler-Natta vanadium catalysts which cannot synthesize EPDM with majority propylene, or with ethylene content less than about 40 wt %, the newly-introduced dual organometallic catalyst systems can prepare EPDMs with majority propylene. When a bimodal EPDM is to be used, it is preferred that the low MW components have majority propylene. Since EPDM with more propylene would have higher Tg, it is desirable to have greater than about 40 wt % ethylene in the high MW components of a bimodal EPDM for lower Tg and better elasticity.

FIG. 1 is a GPC-4D graph of EPDM copolymer produced under Example 1 conditions. The graph is a representative plot of LCB (g') versus Log M, dWt/d log M (including the infrared measured MW (TR), light scattering measured MW (LS), and intrinsic viscosity measured MW (IV)) versus Log M, and ethylene incorporation ($C_2$ wt %) versus Log M. As shown in FIG. 1, ethylene content in the EPDM polymers ($C_2$ wt %) ranges from about 28 wt % for the low MW component to about 51% for the high MW component. The positive slope of the $C_2$ wt % curve is indicative of higher comonomer content in higher molecular weight EPDM copolymers indicative of broad orthogonal composition distribution.

FIG. 2 is a GPC-4D graph of EPDM copolymer produced under Example 2 conditions. As shown in FIG. 2, the curve representing MWD is bimodal showing that the low MW component is the majority component of the EPDM copolymers. Moreover, propylene content ($C_3$ wt %) ranges from about 65% for the low MW component to about 35% for the high MW component. The negative slope is indicative of lower propylene content in higher MW EPDM copolymers.

FIG. 3 is a GPC-4D graph of EPDM copolymer produced under Example 3 conditions. As shown in FIG. 3, the curve representing MWD is bimodal showing that the low MW component is the majority component of the EPDM copolymers. Moreover, propylene content ($C_3$ wt %) ranges from about 70% for the low MW component to about 40 wt % for the high MW component. The negative slope is indicative of lower propylene content in higher MW EPDM copolymers.

The data show that the dual organometallic catalysts provide bimodal EPDM with the low MW component being the majority component by weight having lower ethylene incorporation, while the high MW component is the minor component having greater ethylene incorporation.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A catalyst system comprising:
   A) a bridged biscyclopentadienyl transition metal compound comprising:
      i) at least one unsubstituted cyclopentadienyl ligand or aromatic fused-ring substituted cyclopentadienyl ligand,
      ii) one aromatic fused-ring substituted cyclopentadienyl ligand,
      iii) a bridge group connecting the two cyclopentadienyl ligands, said bridge comprising one or more carbon or silicon atoms, and
      iv) a group 4 transition metal bound to both ligands; and
   B) a transition metal pyridyldiamide compound is represented by Formula (III):

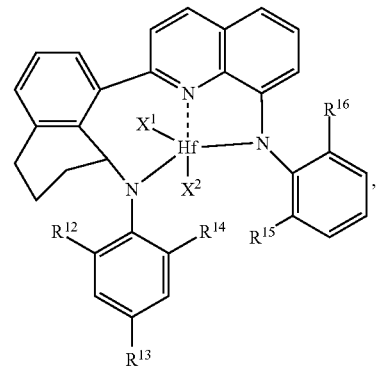

(III)

wherein:
   each of $R^{12}$, $R^{13}$, $R^{14}$, $R^{15}$, and $R^{16}$ is independently hydrogen, methyl, ethyl, propyl, isopropyl, isobutyl, or tertbutyl; and
   each of $X^1$ and $X^2$ is independently halogen or alkyl.

2. The catalyst system of claim 1, wherein the transition metal pyridyldiamide compound is:

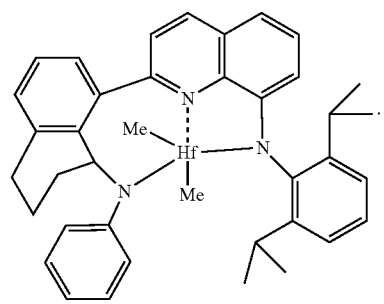

3. A catalyst system comprising:
   (a) the catalyst system of claim 1; and
   (b) a bridged or unbridged metallocene catalyst compound different than the bridged biscyclopentadienyl compound of of (A) and a transition metal pyridyldiamide compound different than the transition metal pyridyldiamide compound of (B).

4. The catalyst system of claim 1, further comprising an activator.

5. The catalyst system of claim 1, further comprising a support.

6. The catalyst system of claim 4, wherein the activator comprises one or more of:
N,N-dimethylanilinium tetrakis(perfluorophenyl)borate,
N,N-dimethylanilinium tetrakis(perfluoronaphthyl)borate,
N,N-dimethylanilinium tetrakis(perfluorobiphenyl)borate,
N,N-dimethylanilinium tetrakis(3,5-bis(trifluoromethyl) phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl) borate,
triphenylcarbenium tetrakis(perfluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate, and
tropillium tetrakis(perfluoronaphthyl)borate.

7. The catalyst system of claim 4, wherein the activator comprises alumoxane.

8. The catalyst system of claim 4, further comprising an activator represented by the formula:

$Z_d^+(A^{d-})$ wherein $A^{d-}$ is a non-coordinating anion having the charge d−; d is an integer from 1 to 3; and Z is a reducible Lewis acid represented by the formula: $(Ar_3C^+)$, where Ar is aryl or heteroaryl, a $C_1$ to $C_{40}$ hydrocarbyl, or a substituted $C_1$-$C_{40}$ hydrocarbyl.

9. The catalyst system of claim 1, further comprising an activator represented by the formula:

$Z_d^+(A^{d-})$ wherein Z is (L-H) or a reducible Lewis acid, L is a neutral base; H is hydrogen; (L-H)$^+$ is a Bronsted acid; $A^{d-}$ is a non-coordinating anion having the charge d−; and d is an integer from 1 to 3.

10. The catalyst system of claim 1, wherein the molar ratio of the bridged biscyclopentadienyl compound to the transition metal pyridyldiamide compound is from about 0.25 to about 2.

11. A method of polymerizing olefins to produce at least one polyolefin composition, the method comprising contacting at least one olefin with the catalyst system of claim 1 and activator, and obtaining a polyolefin.

12. The method of claim 11, wherein the method occurs at a temperature of about 0° C. to about 300° C., at a pressure in the range of from about 0.35 MPa to about 50 MPa, and at a time up to about 300 min.

13. The method of claim 11, wherein the olefins comprise ethylene, propylene, butene, pentene, hexene, heptene, octene, nonene, decene, undecene, dodecene, 5-ethylidene-2-norbornene, dicyclopentadiene, vinyl norbornene, or mixtures thereof.

14. The method of claim 11, wherein the olefins comprise ethylene, one or more of propylene, butene, pentene, hexene, heptene, octene, nonene, decene, undecene, and dodecene, and one or more of 5-ethylidene-2-norbornene, dicyclopentadiene, and vinyl norbornene.

15. The method of claim 11, wherein the olefins comprise ethylene, propylene, one or more of 5-ethylidene-2-norbornene, dicyclopentadiene, and vinyl norbornene.

16. The method of claim 11, wherein the olefins comprise ethylene, propylene, and 5-ethylidene-2-norbornene.

17. The method of claim 11, further comprising introducing the catalyst system and activator into a reactor as a slurry.

18. The method of claim 11, where the polymerization occurs in the solution phase.

19. The method of claim 11, where the polymerization occurs in the slurry phase.

20. The method of claim 11, where scavenger represented by the formula $((R_z-Al-)_y O-)_x$, wherein z is 1-2, y is 1-2, x is 1-100, and R is a $C_1$-$C_{12}$ hydrocarbyl group, is present in the polymerization.

21. The method of claim 11, where scavenger is present in the polymerization and has an oxygen to aluminum (O/Al) molar ratio of from about 0.25 to about 1.5.

22. The method of claim 11, where the polymerization occurs in a single reactor.

23. The method of claim 11, wherein the method occurs at a temperature of about 100° C. to about 300° C.

24. The method of claim 11, further comprising obtaining a copolymer having 50 to 99.9 wt% of a low molecular weight component and 0.1 to 50 wt% of a high molecular weight component (based upon the weight of the copolymer); wherein:
a) the high molecular weight component has:
   i) a peak molecular weight of 2,500,000 g/mol to 10,000,000 g/mol;
   ii) optionally, a spread (half-peak width) from 2 to 20;
   iii) an ethylene content of more than 40 to 80 wt%;
   iv) a $C_3$ to $C_{40}$ alpha olefin (preferably propylene) content of 20 to 60 wt%;
   v) a diene content of 0.1 to 12 wt%;
b) the low molecular weight component has:
   i) a peak molecular weight of 100,000 to less than 2,000,000 g/mol;
   ii) optionally, a spread (half peak width) of 2 to 20;
   iii) an ethylene content of about 10 to about 50 wt%;
   iv) a $C_3$ to $C_{40}$ alpha olefin (preferably propylene) content of 50 to 90 wt%;
   v) a diene content of 0.1 to 12 wt%;
wherein the copolymer has:
   1) a $g'_{vis}$ value of about 0.95 or greater;
   2) an Mw of 500,000 g/mol or more;
   3) an Mn of 75,000 g/mol or more;
   4) an Mw/Mn of from 3 to 15; and
   5) an ethylene content of 55 wt% or less.

25. The catalyst system of claim 1, wherein the transition metal pyridyldiamide compound is one or more of:

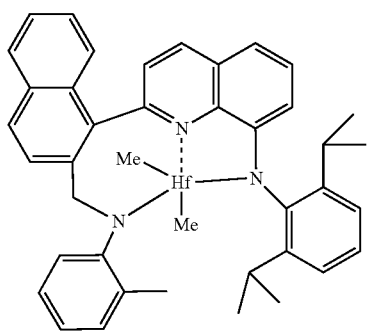
(3)
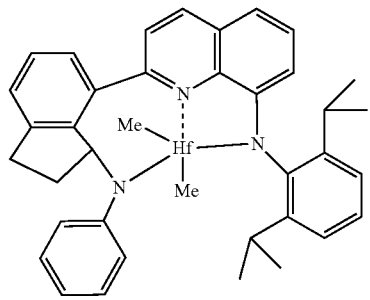
(7)
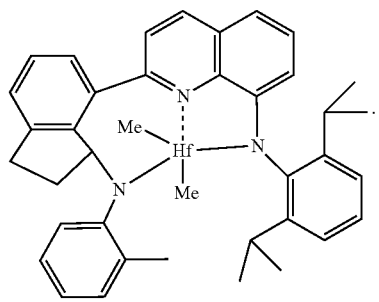
(8)
* * * * *